(12) United States Patent
Quick

(10) Patent No.: US 7,973,296 B2
(45) Date of Patent: Jul. 5, 2011

(54) ELECTROMAGNETIC SYSTEMS WITH DOUBLE-RESONANT SPIRAL COIL COMPONENTS

(75) Inventor: Richard T. Quick, Alpine, TX (US)

(73) Assignee: Tetraheed LLC, St. Louis, MO (US)

( * ) Notice: Subject to any disclaimer, the term of this patent is extended or adjusted under 35 U.S.C. 154(b) by 290 days.

(21) Appl. No.: 12/399,014

(22) Filed: Mar. 5, 2009

(65) Prior Publication Data
US 2010/0059692 A1    Mar. 11, 2010

Related U.S. Application Data

(60) Provisional application No. 61/033,885, filed on Mar. 5, 2008.

(51) Int. Cl.
*G21K 5/00* (2006.01)
(52) U.S. Cl. .................. 250/492.1; 156/345.26; 333/219
(58) Field of Classification Search ................ 250/492.1
See application file for complete search history.

(56) References Cited

U.S. PATENT DOCUMENTS

| | | | | |
|---|---|---|---|---|
| 2,946,919 A | * | 7/1960 | Lerbs | 315/39 |
| 3,442,758 A | * | 5/1969 | Penfold et al. | 376/123 |
| 6,035,868 A | * | 3/2000 | Kennedy et al. | 134/1.1 |
| 6,960,968 B2 | * | 11/2005 | Odendaal et al. | 333/219 |

* cited by examiner

*Primary Examiner* — Phillip A Johnston
(74) *Attorney, Agent, or Firm* — Patrick D. Kelly

(57) ABSTRACT

Spiral coils generate very powerful electromagnetic fields by operating with two different but simultaneous resonant behaviors. Quarter-wave resonance is established by adjusting the frequency (and wavelength) of a radiofrequency (RF) voltage source until the length of the spiral conductor is equal to ¼ of the wavelength of the alternating voltage. This generates an electromagnetic standing wave with at least one peak node and at least one null node. Inductive-capacitive (L/C) resonance is established by optimizing the thickness and width of the wire ribbon used to make the spiral coil. When inductance and capacitance are balanced, the current response will synchronize with the voltage input, creating in-phase behavior, minimal total impedance, and maximal power output. If two such coils are placed near each other, they will create an extremely powerful electromagnetic field between them, which can promote chemical and plasma reactions involving charged particles such as ions or plasma particles, possibly including nuclear fusion reactions.

7 Claims, 10 Drawing Sheets

Fig. 2
Wire length = single wavelength
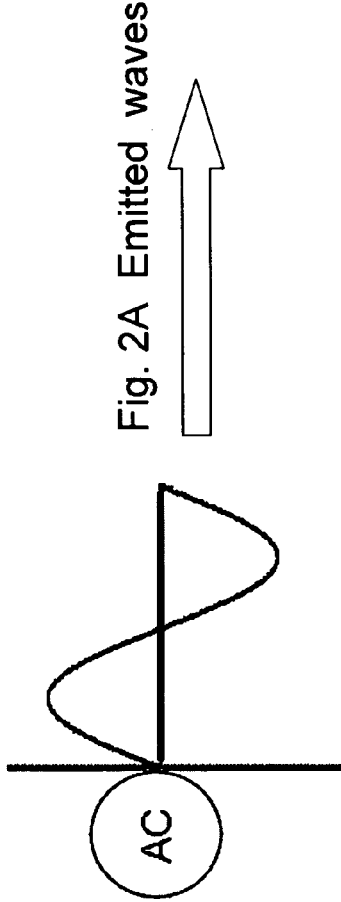
Fig. 2A Emitted waves
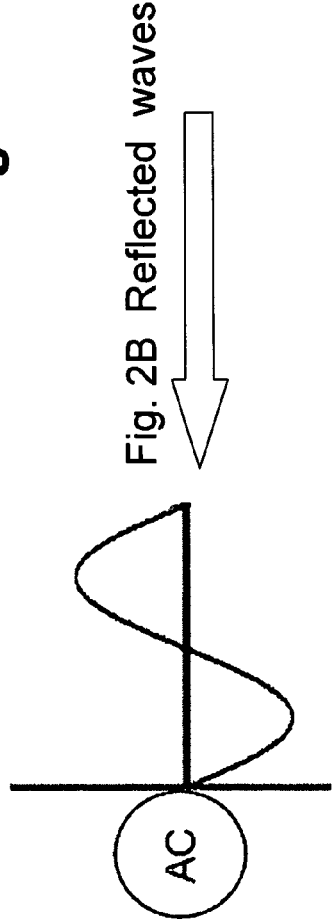
Fig. 2B Reflected waves
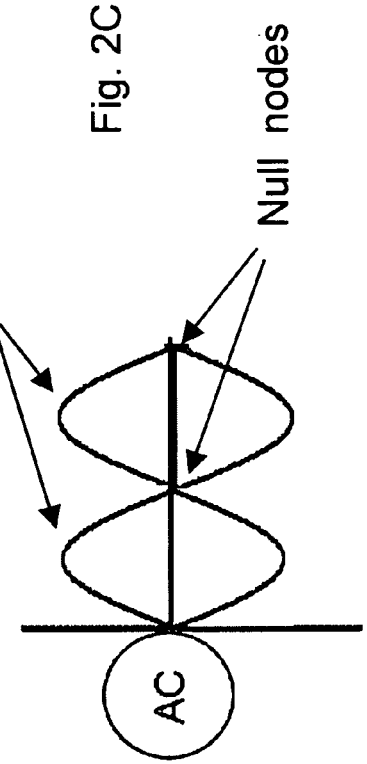
Fig. 2C Superimposed waves create standing waves

Fig. 3
Wire Length = ½ Wavelength
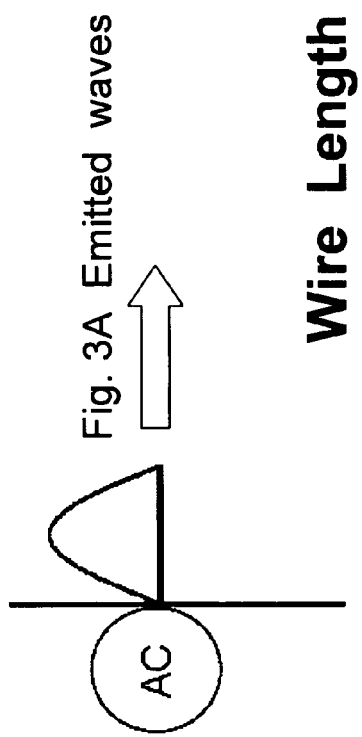
Fig. 3A Emitted waves
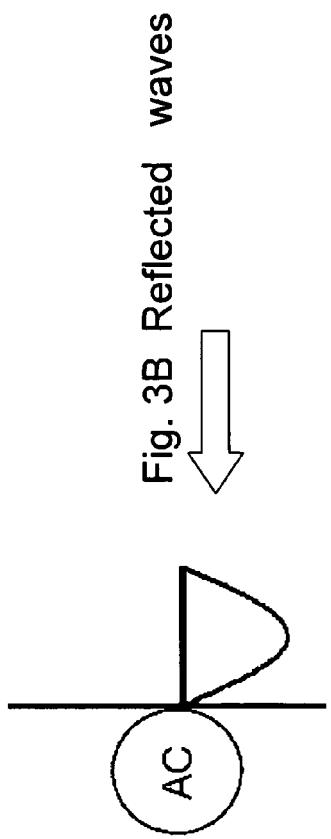
Fig. 3B Reflected waves
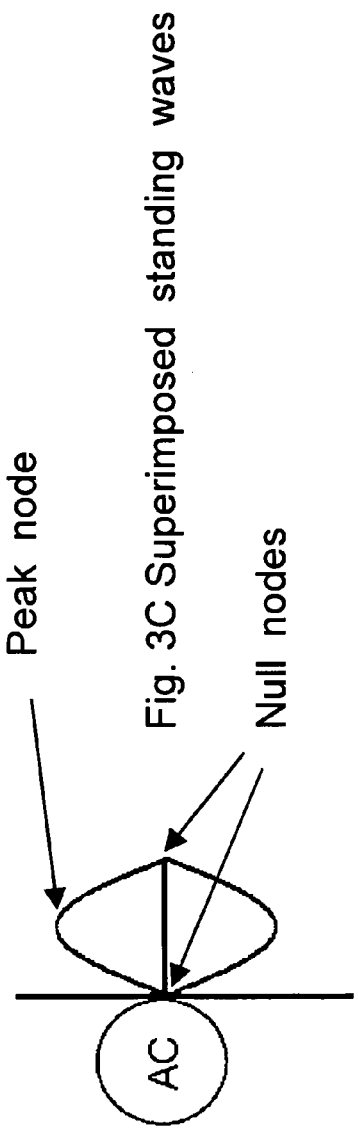
Fig. 3C Superimposed standing waves
Peak node
Null nodes

ELECTROMAGNETIC SYSTEMS WITH DOUBLE-RESONANT SPIRAL COIL COMPONENTS

RELATED APPLICATION

The Applicant claims the benefit, under 35 USC 119, of provisional patent application No. 61/033,885, filed on Mar. 5, 2008.

FIELD OF THE INVENTION

This invention is in the field of electrical devices, and relates to electrical components and systems that can generate strong and powerful electromagnetic standing waves within an enclosed volume. The resulting strong electromagnetic fields have various uses, such as in chemistry involving ions or other charged particles, and in various types of imaging, diagnostic, and other devices.

BACKGROUND OF THE INVENTION

To understand this invention, the reader must be aware of two different types of electrical and electromagnetic phenomena that can occur in certain types of circuits. Both types of phenomena are referred to as "resonant" responses (or resonant activities, behaviors, etc.), but they have no connection or relation to each other, and they are created by completely different causes.

This invention involves the creation of certain types of electrical components that can simultaneously achieve both types of resonating behavior at a single operating frequency, which in most cases will be between 10 kilohertz (kHz, where 1 hertz is one cycle per second) and 1 megahertz (mHz). These components are exemplified herein by structures referred to as "spiral coils", generally having the shape of a flat round disc, which can be modified to give a disc a conical or other shape if desired. Each such disc is created by shaping a single long conductor (such as a thin pipe, wire, or flat ribbon, made of a metal such as copper, covered by an insulating layer) into a geometric shape called an "Archimedes spiral". This type of spiral is generally flat and disc-shaped (also referred to as having a pancake shape), which distinguishes this class of spiral from other types of three-dimensional spirals that are not flat (such as screw threads and helixes, also spelled helices).

The next two sections describe the two different types of "resonant" behavior in electric circuits. These sections are prior art, and they are well-known to physicists and electrical engineers, who are invited to skip these sections, which are included herein for the benefit of business managers, attorneys, and others who have not studied these fields of electronics, electrical engineering, and physics.

"Quarter-Wave" Resonance; Standing Electromagnetic Waves

One of the two main types is electrical resonance is referred to herein as quarter-wave resonance. This type of resonance depends almost entirely on the length of a wire element. For reasons described below, if a segment or length of wire is ¼ as long as the "voltage waves" that are traveling through the wire, then a set of "reflected" waves will be added to the emitted waves, in a synchronized alignment that creates stronger "superimposed waves".

Accordingly, an understanding of the "quarter-wave" phenomenon will help a reader understand how a straightforward and easily-controlled factor (i.e., the length of a wire ribbon that will be used to form a spiral coil) can help create a "quarter-wave" resonant response, which will create the types of electromagnetic pulses and fields referred to as "standing waves".

The speed at which a voltage impulse is transmitted through a metal wire is extremely fast. It is essentially the same as the speed of light, which travels 300 million meters (186,000 miles) in a single second (that distance would circle the earth more than 7 times).

If wavelength (in meters) is multiplied by frequency (cycles per second), the result will be the speed of light, 300 million meters/second. Therefore, the wavelength of an "alternating current" (AC) voltage, at some particular frequency, will be the speed of light, divided by that frequency.

Therefore, using simple division, if an alternating voltage operates at a frequency of 1 megahertz (Mhz), which is a million cycles per second, then the "wavelength" at that frequency will be 300 meters. If the frequency drops by half, to 500 kilohertz, the wavelength becomes twice as long (600 meters); and, in the other direction, if the frequency increases to 2 megahertz, the wavelength drops to 150 meters.

It should be noted that the term "cycles" is what scientists call "a dimensionless unit", which drops out and becomes silent when other physical terms are multiplied or divided.

At AC frequencies of 10 kilohertz or greater, the common references to "alternating current" (AC) voltage begin using a different term, which is "radiofrequency" (RF) voltage. Accordingly, RF voltage is a form (or subset) of AC voltage, which operates at frequencies higher than 10 kilohertz. RF power generators are readily available, and are sold by numerous companies that can be easily located by an Internet search, using the term "RF power generator". For example, Hotek Technologies Inc. (hotektech.com) sells two RF power generators, called the AG 1024 and AG 1012 models, which can provide output power at frequencies ranging from 20 kHz to 1 MHz; the 1012 model has a power output of 1000 watts, while the 1024 model has a power output of 2000 watts. The output frequency of any such RF power supply can be adjusted and "tuned" across the entire range of operating frequencies, merely by turning knobs or manipulating other controls in a power supply of this type.

In a wire having a fixed and unchanging length, the easiest way to create a "standing wave" is to adjust the RF frequency emitted by a power supply with an adjustable frequency, until the "tuned" frequency creates a wavelength that is 4 times as long as the wire. This principle is well-known to physicists, and it is commonly referred to as "quarter-wave" behavior, since the length of the wire segment must be ¼ as long as the wavelength. Since it is important to this invention, the principles behind it are illustrated in a series of drawings provided in FIGS. 1-4, all of which are well-known prior art.

FIG. 1A indicates an idealized wavelength of an alternating voltage, depicted by a sine wave that is being sent from an AC power supply (shown by a circle at the left end of a horizontal straight wire) into the "input" end of the wire. The voltage waves travel through the wire toward the right, as indicated by the block arrow in FIG. 1A. When the waves reach the end of the wire, they cannot leave the wire (at least, not in a simplified and "ideal" system, which is being assumed and used herein to explain the principle of how a simple straight wire can create a standing wave). Therefore, the voltage wave will effectively "bounce" or "reflect" back from the tip of the wire, and the "reflected wave" will begin traveling back through the wire, going in the opposite direction, as indicated by the left-pointing block arrow in FIG. 1B.

Because of the laws of conservation of energy, the reflection and "return travel" of these types of waves, when they bounce off the tip of a wire, is actually quite good, and rather efficient, as discussed below, provided that the wire tip does not emit sparks, arc discharges, or other "escaping" electrical energy.

Accordingly, FIG. 1A depicts a set of "emitted waves" traveling toward the right, while FIG. 1B, aligned below FIG. 1A, depicts an idealized set of "reflected waves" traveling toward the left in the same wire.

FIG. 1C illustrates what happens when both sets of waves (emitted and reflected) are superimposed on each other. Since the two sets of waves are traveling at exactly the same speed, and since they have exactly the same wavelength, they will create a "standing wave" pattern when they are added together. As can be visualized from FIG. 1C, there will be a first set of locations, along the length of the wire, that can be referred to as "peak nodes", where the alternating current voltage will be going through maximum fluctuations.

In a location halfway between a pair of adjacent "peak nodes", there will be a spot that can be called a "null node", a "zero node", a trough or valley node, or similar terms. At each "null node" location, the alternating current voltage will appear to be not fluctuating at all. Those are the sites, along the length of the wire, where each "positive" hump (created by a sine wave traveling toward the right) will be counter-balanced and offset by a "negative hump" with the exact same height, traveling at an identical speed toward the left.

As a result, this type of response within a wire creates a "standing wave". If the instantaneous voltage is measured at a "null node", it would appear that nothing is happening, in terms of fluctuating voltage. Furthermore, the "null node" will not be moving, along the length of the wire; instead, it will appear to be standing still.

This can be demonstrated, in a coil, by using a "grounded lead" to test for voltages along the length of a coil. If a "grounded lead" coupled to a volt meter is used to touch the surfaces of a series of strands in a non-insulated coil (such as a coil made of thin copper tubing, wrapped around a plastic cylindrical shape, as used in the types of large transformers used by hobbyists to create "Tesla coils" that will emit large and visually impressive electrical arcs), the "test lead" will detect no apparent voltage at a null node, which will occur at some particular strand in the coil. At a different strand of the coil, the "test lead" will detect an alternating voltage that has twice the strength and intensity of the voltage being emitted by the power supply.

If voltage is measured at a "peak node", the voltage will be doing something that can be called, using vernacular or lay-men's terms, "the full-tilt boogie". The AC voltage levels will be moving back and forth, between: (i) a very high and intense positive voltage, to (ii) an equally intense negative voltage. This is indicated by the "bubble" shapes shown along the wire in FIG. 1C.

The "bubbles" that are shown in FIG. 1C can help someone understand how standing waves are created, and how they act in a synchronized manner. However, that drawing fails to show another result which is very important in what actually happens in a standing wave. For purposes of description and analysis at this introductory level, the system can be assumed to be "ideal", which implies a perfect "mirror-image" reflection of each wave from the right end of the wire. An "ideal" system also implies that no reflections occur at the left end of the wire where the power supply is located, and all "reflected" wave activity simply ceases. In real circuits and wires of this type, second and third order reflections do in fact occur, and they are used to further increase the strength and power output of these types of systems; however, those additional factors and "harmonics" should be ignored until after the basic principles of this type of system have been grasped and understood.

In an ideal system, when the reflected waves (which are traveling toward the left, in the wire segments illustrated in FIG. 1) are "superimposed" on the emitted waves (traveling toward the right), the "peak" positive voltage that will be instantaneously reached, at the highest point of each "bubble" shown in FIG. 1C, will occur when the positive peak of an emitted wave crosses a mirror-image positive peak of a reflected wave, traveling in the opposite direction. Accordingly, when those two "positive peak" values are added to each other, the instantaneous positive peak voltage that will occur, in the wire, will actually be twice as intense as the "positive peak" voltage being emitted by the AC power supply.

An instant later, at that exact same point on that segment of wire, a negative peak voltage will be created, which will be the sum of (i) the negative peak voltage emitted by the power supply, and (ii) the negative peak voltage of a reflected wave also will pass through, traveling toward the left. At that instant, when those two negative peak voltages are added to each other, the instantaneous negative voltage that will occur, in the wire, will be twice as intense as the "negative peak" voltage being generated by the AC power supply.

A more accurate and representative visual depiction of a "standing wave" in a wire would actually show the heights of the peaks as being twice as tall as the peaks of the emitted voltage waves, and the reflected voltage waves. However, that depiction might confuse people, so it usually is not shown in drawings of "standing waves".

Accordingly, the instantaneous response in the wire, at a location halfway between two "null nodes", is doing something that can fairly and properly be called "the full-tilt double double boogie". The "double double" phrase (note that it contains not just one but two "doubles") was added to that phrase, for two reasons:

(i) To emphasize the fact that each and every voltage peak (maximum positive, and maximum negative) will be twice as strong, and twice as intense, as the maximum positive and negative peak voltages emitted by the power supply; and, (ii) to point out that the frequency of the superimposed "bubbles", shown in FIG. 1C, is actually twice as fast as the frequency of the AC cycle that is emitted by the power supply, as discussed below.

The "twice the intensity" result is directly comparable to what an observer will see, if a large mirror is placed behind a light bulb in an otherwise dark room. The mirror effectively keeps the room dark, everywhere behind the mirror, so there is no "magical doubling" of the light in the room; that would violate the basic law of conservation of energy. Instead, what the mirror does is to shift light away from the backside of the mirror, and keep that light energy on the reflective side of the mirror. Anyone standing in front of the mirror will see two apparent lightbulbs. Both of those lightbulbs (the original bulb, and the reflected image) will have the same brightness (if the mirror is perfect). Therefore, the mirror will double the intensity of the light energy reaching the observer.

That same effect, in a circuit, will happen if the end of a wire acts like a mirror. If a wire does not have any components that will cause it to become an active "emission source" (which is the behavior of transmission antennas and certain other components), in a way that efficiently releases voltage-created energy into the atmosphere, then the basic rules that require conservation of energy will prevent that energy from simply disappearing and ceasing to exist. As a result, even if the end of a wire is not designed to be a perfect reflector, a large portion of the voltage wave will indeed reflect off the wire tip, and travel back through the same wire, in a "second pass".

To adequately understand the type and amount of "wave reflection" that occurs at a wire tip, consider what happens if a light bulb is shining in a room that has shiny, glossy white paint on all the walls and ceilings; then, consider how it would look if the same light bulb were located in a room with all of the walls and ceilings painted "flat black". The total amount of light that would be available, to carry out a task such as reading a newspaper, clearly would be much greater in the white room, because light reflects off of white paint, even though white paint does not even begin to approach the type of "reflection quality or clarity" that a mirror creates. The difference in what happens, when light intensity in a room painted flat black is compared against a room painted a glossy white, does not arise from the presence or absence of "reflection quality or clarity"; instead, it is governed by the laws of conservation of energy. When light shines onto a surface that is painted flat black, the light energy is absorbed by the paint, and it literally warms up the paint. By contrast, glossy white paint will not absorb light energy, so it reflects the light back out, for a "second pass" through the air that fills a room.

Because of the laws of conservation of energy, and without depending on any "quality of reflectance" trait that is built into wire tips, electrical energy cannot simply disappear, when it reaches the tip of a wire. Instead, only two things can happen to that energy:

(i) the electrical energy can be emitted into the surroundings, such as by emitting sparks, arcs, or radiofrequency signals that will carry energy; or (ii) if the energy is not emitted by the tip of the wire, then, by simple necessity and because of the basic law of conservation of energy, it must be reflected back into the wire, and it will be forced to travel back through the wire again.

If a wire has a long and tapered tip, then the reflected wave might become somewhat diffused, and it might lose some portion of the "clarity" of the wave. However, since wavelengths in the frequencies of interest herein are hundreds of meters long, the type of tip created by a conventional wire cutter will not create any significant diffusion, in a reflected wave. And, unlike the white-painted walls of a room, there is not a large area that is available, at the tip of a wire, that can create scatter, spread, or diffusion. As a result, the tip of a wire will be a relatively efficient mirror-type reflector, when an AC voltage is "pumped" into one end of the wire.

The second factor mentioned above, when the "double-double" boogie phrase was mentioned, relates to a doubling of the frequency of a standing wave. When a standing wave is created in a wire by reflection of an emitted AC voltage wave, the frequency of the standing wave is, quite literally, double the frequency of the emitted wave.

This can be seen, visually, by noting that in the emitted AC voltage, shown in FIG. 1A, a single complete wavelength contains both a "positive hump" and a "negative hump". Accordingly, three complete sine waves, divided into three segments by the imaginary vertical lines, are shown in FIG. 1A.

By contrast, each and every "bubble" shown in FIG. 1C depicts a complete and total "wavelength", in a standing wave. Six of those standing wave "bubbles" fit into the exact same length of wire that holds only 3 emitted wavelengths from the power supply.

The "frequency doubling" effect of standing waves is important, because alternating current systems can convey and release energy in a manner that increases, as the frequency of the AC voltage supply increases. To some extent, this is analogous to saying that, if a motor can be run at twice the speed (while still generating the same torque), then the work output of that motor can be twice as great, at the twice-as-fast speed. That analogy is not entirely accurate, since work output from an electric device that uses AC power depends on "area of the curve" functions that occur when sine waves are involved. Nevertheless, as a general principle, if voltage frequency increases, then power output will also increase, in many types of electric circuit components.

Accordingly, the three panels in FIGS. 5A, 5B, and 5C depict those general principles of standing waves, in a way that can be visually understood by considering what happens in a wire with a length equal to a multiple of the voltage wavelength.

In the three panels of FIG. 1, the wire length is three times as long as the wavelength of the voltage from the power supply. However, to create standing waves, a wire length does not need to be any particular multiple of the wavelength of an AC voltage. As can be seen by considering FIG. 1C, the same types of "bubbles" would be created: (i) if the wire length were exactly twice as long as the wavelength; or, (ii) if the wire length were the same length as the wavelength.

Accordingly, FIG. 2 (which includes FIG. 2A showing an emitted wave, FIG. 2B showing a reflected wave, and FIG. 2C showing the superimposed "bubbles") shows what happens in a wire segment that has a length that is equal to a single wavelength from an AC voltage at a fixed frequency. A resonant standing wave will be formed, with a frequency that is double the frequency of the input AC voltage. That same result will apply, in a wire having any length that is an exact (integer) multiple (such as 1×, 2×, 3×, etc.) of the wavelength of the AC voltage being pushed (or forced, driven, pumped, etc.) into the wire segment.

Moving to still shorter wires, the same principle also applies to any wire with a length equal to ½ of an AC voltage wavelength. As shown in FIG. 3 (which includes FIG. 3A showing an emitted wave, FIG. 3B showing a reflected wave, and FIG. 3C showing the superimposed "bubbles"), if the wire length is ½ of the wavelength, a natural and resonant standing wave will still form, with a frequency that is double the frequency of the input AC voltage.

Finally, moving to a still shorter wire, the same principle also applies to any wire that has a length equal to ¼ of an AC voltage wavelength, as shown in FIGS. 4A, 4B, and 4C. Even though it does not stretch across or cover a complete "bubble", the standing wave shown in FIG. 4C is nevertheless a stable, natural, and resonant "standing wave", with a frequency that is exactly twice the frequency of the input AC voltage.

It can be possible to create partially stable and semi-resonant responses, using ⅛, 1/16, or shorter lengths of wire, by using additional devices that can remove electrical power from the system, or that can generate effects that are usually called "harmonics". However, those are not the types of natural and stable responses that can be created by a simple, basic system consisting of nothing more than: (i) a wire having a fixed length and a "reflective" tip; and (ii) an AC power source with a frequency that can be "tuned" until it creates a resonant response in any wire segment having a suitable length.

Therefore, since quarter-wave wire lengths are the shortest lengths that can create natural and stable standing waves, the conventional term that is commonly used, to describe what happens when a wire creates a resonant standing-wave response, is a "quarter-wave" response.

In some devices, telescoping components (or other elements that can alter the effective length of a wire-type element) can be used to alter the ability of the element to respond to a fixed wavelength. Many types of antennas use this approach, if they need to process signals that are being transmitted on fixed and known frequencies. However, those examples are not relevant to spiral coil reactors, which will use an approach that involves tuning and adjusting the frequency of the voltage that is being supplied to a reactor, until a resonant response is observed in coils with fixed and unchanging lengths.

It should also be noted that certain types of "tuning" elements (such as capacitors, which can have either fixed or adjustable capacitance levels) also can be electrically coupled to a wire, in a manner that "emulates" adding more length to a wire. This approach can be used to alter (or increase the range of) the frequencies that a wire circuit will resonantly respond to. Capacitors and other "tuning" elements will be able to provide "tuning" capability to at least some types of spiral coil reactor discs as described herein. However, high-performance reactors designed for very high voltages and frequencies will need to have a strong, stable, and "robust" ability to resist or handle kickbacks, power surges, and other adverse events. Therefore, in "high-performance" reactors, any added tuning element or other nonessential component will create an additional opportunity and location where something might fail. As a result, any such additional elements generally should be avoided, when possible.

Accordingly, a preferred approach to designing and assembling high-performance spiral coils, for use in reactors as described herein, involves:

(i) creating two identical strong and sturdy coils that will both respond to a single "resonant frequency", in a manner that will not require additional tuning elements; and, (ii) using an AC power supply with a adjustable (tunable) frequency, to provide a resonant frequency that works well with both coils.

It was mentioned above that the "ideal" system that was used to describe the principles of "quarter-wave" behavior, in a wire coupled to an AC power supply, required two assumptions:

(i) completely efficient reflection of the wave, at the "mirror" end of the wire (the right end, in FIG. 1); and, (ii) total absorption of the reflected wave, once it travels in a "second pass" back to the power supply.

In a real system, neither of those assumptions will be completely accurate. Among other things, there will be some loss and emission of power (both along the length of the wire, and at its end) which will erode the power and "peak heights" of the reflected waves; and, there will be some "reflection and bounceback" of the second-pass reflected wave, when it reaches the "entry" end, where the wire is connected to the power supply.

However, rather than undercutting or contradicting the "idealized" assumptions that can help explain how standing waves are generated by "quarter length" wires, the partial losses and partial reflections that occur in real coils actually help explain what really occurs, when resonant standing waves are formed inside a real wire.

What actually happens, inside such a wire, is that a set of third pass waves (which will reflect off of the left end of a wire segment, where the power supply is attached) will fall into either of two different conditions:

(1) If the "third pass" wave is "in phase" and aligned with a "new" set of outgoing voltage waves (fresh from the AC power supply), then those two sets of waves will work together, and will be aligned and synchronized, so that each wave enhances and strengthens the other wave. This creates a substantially more powerful wave (which can be called a "first-and-third" wave), which travels through the wire, away from the power supply (toward the right, in FIG. 1). When that stronger and more powerful "first-and-third" wave reaches the reflective right end of the wire, most of that stronger combined "first-and-third" wave will bounce back, thereby creating not just a "second pass" wave, but a "second-and-fourth pass" reflected wave, which also will be correspondingly stronger, and more powerful.

This leads to even greater and higher "superimposed" voltage peaks in the wire, and it doesn't stop there. If they are properly and perfectly synchronized with each other, then all of the "odd numbered" waves will begin to build up, higher and higher, adding to each other and traveling in synchronized harmony toward the right. Furthermore, the fact that the aggregated "odd-numbered waves" become higher and higher, leads to a corresponding increase in the height and strength of the aggregated "even-numbered waves", which are reflecting off of the tip at the end of the wire, and traveling back through the wire toward the power supply.

That is what creates resonant "standing waves" in a wire or electric circuit that is long enough to create standing waves. If any and all of the "accumulated feedback" in a system can be smoothly and efficiently added to, coordinated with, and synchronized with an "initial output", then that behavior, in that circuit, is classified and referred to as a "resonant response". Anyone who has seen a resonant response peak of that type (which can be, quite literally, orders of magnitude higher than any surrounding nonresonant response levels), on an oscilloscope or similar monitor, can visually see what happens when an input frequency is adjusted so that a set of "feedback" signals begin to act in synchrony and harmony with the initial signal.

(2) In direct contrast to the above, and as the only other option out of the two possible options (i.e., they are either synchronized, or they are not synchronized), if the "feedback" signals are not synchronized and aligned with the "initial output", then the "feedback" signals will not merely fail to boost the initial output. Instead, the feedback signals will actively interfere with the initial output, in ways that aggressively undercut its power and reduce its efficiency. The "feedback" begins acting in a manner comparable to small children who insist and demand that their father must carry them, while he is trying to run a race. They are not neutral, and they cannot be ignored; therefore, they become actively disruptive and detrimental, in a system that is struggling to work efficiently. This explains the other side of how and why a "resonant response" can be orders of magnitude higher and more powerful than non-resonant responses.

As a simple demonstration of how powerful and important "standing wave resonance" can be, consider what happens when someone uses a knob, rather than a button, to tune an old-style radio to a certain radio station. The reason that a listener can hear that particular station clearly, without also hearing static and noise from all the other radio stations in that city, is because the tuning mechanism, inside that radio, has been set to a level that creates a "resonant response" with the frequency of the selected radio station. The signals from any other station, even at the closest adjacent frequencies being used by other radio stations, are so much weaker that they can be easily filtered out, and cannot even be heard, on any decent radio tuned to a station that is broadcasting at a certain frequency. That demonstration offers an example of how focused, powerful, and effective a "resonant response" can be, compared not just to background noise, but also to non-resonant responses at "close but not exact" frequencies.

Before leaving the topic of "quarter-wave" or "standing wave" resonance, it should be noted that if an RF power generator has a frequency range up to 1 Mhz (such power supplies are common, and can be used for testing herein, which is why they are being mentioned now), the shortest wavelength they can emit reliably will be 300 meters, at 1 Mhz. That 300 meter minimum wavelength will require that a wire having a "quarter wave" length must be at least 75 meters long, to generate standing waves when that power generator is used. Since many electrical devices suffer from distortion and other problems when they operate at the outer limits of an advertised or rated operating range, the smallest and shortest coils that are of interest herein, for analyzing the types of double-resonant behavior that will create powerful standing waves, will be about 80 meters long. That wavelength corresponds to a 940 khz frequency, which can be achieved with a fair margin of safety, with minimal distortion, by nearly any power generator that is rated at a 1 Mhz maximum frequency.

This completes an overview of how the length of a wire will determine a resonant standing wave frequency, in a simple system consisting of a wire coupled to an AC power supply.

However, the length of the wire is not the only important factor that will affect how a spiral coil reactor will perform. Instead, standing wave resonance is only one of two important types of electrical resonance. A completely different type of resonance is discussed in the next section.

Inductance, Capacitance, L/C Balance, and "In-Phase" Power

Inductance (represented by the letter L) and capacitance (represented by the letter C) require close attention in designing, testing, and optimizing spiral coils that can achieve the high efficiency in generating powerful electromagnetic fields that can work in charged-particle reactors as described herein.

The three properties that physicists and electrical engineers call inductance, capacitance, and resistance are grouped together and collectively called "impedance". Those three factors are the three main factors that can and will "impede" (i.e., hinder and reduce) the efficient flow of current, through a circuit. All three of those "impedance" factors and their effects (and the types of components that can be used to create, reduce, apply, avoid, control, and manage them) are taught in any basic course in electrical engineering, and it would be an act of incompetence for an electrical engineer to design any type of circuit without analyzing all three impedance factors, and without taking all three into account.

Briefly, inductance (represented by L) refers to the tendency of any wire coil to resist any change in current flow (or in electromagnetic field strength), as an immediate and instantaneous response to a change in the voltage that is applied to the coil. Therefore, inductance is analogous to the mechanical traits of inertia, momentum, and mass. A car cannot instantaneously change from traveling at a certain fixed speed, to traveling at a faster speed, as an instantaneous effect of some applied force. No matter how much force is applied to a car, there must be some time lag that will occur, while the car accelerates to a higher speed, in response to a higher level of force being applied to it. The needle on a car's speedometer cannot instantaneously jump from 30 miles per hour, to 50 miles per hour; instead, when a car accelerates, the needle must and will rotate through an arc that will pass across each of the intervening speeds. That is the nature of mass, momentum, and inertia.

The same principle applies to the current response in an inductor coil, when the voltage changes. If a higher voltage is applied to the coil, the coil will not and cannot respond with an immediate and instantaneous "matching" rise in current flow. Instead, any change in current will "lag behind" a voltage change.

That "lag time" becomes crucially important in "alternating current" systems, such as (for example) the 60-cycle AC power system that is used in North America. In an electric motor, or in any other device that converts electric power into actual work output, the efficiency, power rates, and actual work output of the motor or other device depend on multiplying voltage, and current. Indeed, the very definition of a "watt" (the most important and basic unit of electric power) is this: a watt is the amount of power that is being provided, and used, when 1 volt is driving 1 ampere (or amp) of current, through some type of electrical device. By simple math, a kilo-watt of power (i.e., 1000 watts) is being provided, and used, when a voltage of 100 volts drives 10 amps through an electrical device.

In a "direct current" system, it is easy to multiply a steady and unchanging voltage value, times a steady and unchanging current value. However, in an alternating current system, where the voltage follows a "sine wave" function that alternates back and forth between positive and negative values, 60 times every second, while following a rounded and sloping curve without any "square blocks", that type of multiplication becomes much more complicated. As a result, if instantaneous peak current values are not aligned properly (in time) with peak voltage values, the system will suffer from problems that are referred to by phrases such as "out of phase" and "unsynchronized". The system will also be referred to as having a low (or hindered, impaired, etc.) power factor.

If a motor or other device is forced to perform in an "out of phase" manner (or, stated in different but consistent terms, if the device has a low power factor), it cannot and will not perform with optimal efficiency. This would be analogous to listening to a song, where half of the instrumental and vocal tracks were laid down, in the final mixed version, a fraction of a second behind the other instrumental and vocal tracks. That kind of "mix" would sound awful, and no one would want to hear it.

"Out-of-phase" problems are common. As one example, they would occur (if not corrected) in nearly all electric motors, since the "windings" in nearly any type of electric motor will create inductance, which in turn will force the current responses (inside the motor windings) to lag behind (and be "out-of-phase" with) the voltage cycle.

Fortunately, there are ways to correct "out-of-phase" performance problems, in motors and other appliances that use coils and windings, by using controlled levels of capacitance to offset and "balance" the inductance created by the coils or windings.

In an AC circuit that operates on a regular cycling basis, capacitance will cause the current response in the circuit to "lead" (or precede, antecede, etc.) the voltage cycle. In this context, the type of phase-shifting or time-shifting that causes a current cycle to "lead" the voltage cycle is the opposite of what happens when inductance causes a current cycle to "lag behind" a voltage cycle.

Since capacitance shifts a cyclic current response in a leading direction (i.e., a current peak occurs slightly before a voltage peak, in time), while inductance shifts the cyclic current response in a lagging direction (i.e., the current peak occurs after the voltage peak), those two effects can be balanced out against each other, and they will cancel out each other. To accomplish that result, any desired quantity of capacitance can be added to a circuit, merely by inserting a "capacitor" (a straightforward class of electronic components that can be purchased in a wide range of sizes) into a circuit, at a suitable location, so that the leading effect created by the capacitor will offset (or neutralize, balance out, etc.) the lagging effects that otherwise are created by any coils that create inductance in the circuit.

Accordingly, if an AC circuit which has some level of inductance is provided with the proper amount of capacitance to create a condition referred to herein as L/C balance, this means that the circuit has a current response that is aligned and synchronized with its voltage input (which will be regular and cyclical, in an AC circuit). In this circuit, the alternating voltage cycle, and the alternating current response, will be "in phase".

Furthermore, as mentioned above, power is calculated by multiplying voltage times current. In an AC circuit, this type of multiplication must take into account the timing and synchronization of the voltage, and the current. If those two different wave forms (the voltage input, and the current response) are properly aligned, in an AC circuit that has a good L/C balance, then the power factor of that AC circuit will be optimized. By contrast, if the current and voltage cycles are out-of-alignment, and out-of-phase, its power factor will be hindered, reduced, and damaged.

Stated in alternate but consistent terms, if an AC system is operating with an L/C balance, the inductive impedance is offset (or neutralized, cancelled, balanced, etc.) by the capacitive impedance. When those two types of impedance are properly balanced against each other, the total impedance (which translates into "hindrance") of the circuit drops to its lowest possible level. That lowest possible level of impedance is often called "ohmic impedance", since this type of "pure" or "residual" resistance is measured and expressed in ohms). When inductance and capacitance cancel out each other, and only a residual "ohmic" resistance remains, an electric circuit or device can work at its most efficient level.

Capacitance (and capacitor components) are created by placing conductive surfaces (such as plates, leaves, coils, etc.) close to each other, in a way that enables the positive charges on one metal surface to attract, "stabilize", and balance out the corresponding negative charges on a nearby metal surface. The capacitance level of a device such as a capacitor is usually measured and expressed in "farads" (derived from the name of the scientist Michael Faraday), or multiples or fractions of farads, such as millifarads (mf). However, the type of capacitance measured in "farads" normally uses direct current, and indicate what is effectively an unchanging "temporary charge-holding capacity" of a capacitor.

By contrast, capacitance in an AC circuit is not a constant value that can be measured once, and then treated as a constant. Instead, capacitance in an AC circuit will usually drop, as the operating frequency increases. Therefore, that type of "dynamic capacitance" is referred to by a variable, which is C.

That completes an introduction to the two different types of electrical and electromagnetic resonance.

The Applicant herein is not aware of any prior devices that combine both types of resonant behavior (i.e., standing-wave resonance, and L/C balance resonance) into a single circuit element. Although various types of devices (such as radio and television receivers) have both (i) a tuning device which uses quarter-wave resonance, and (ii) an amplifier circuit that uses L/C resonance, to the best of the Applicant's knowledge, no one has ever previously created or identified any electrical components that deliberately create and utilize both types of resonance simultaneously, with the possible exception of components that may exist in extremely large "particle accelerators" (also called "atom smashers") that cost billions of dollars to build.

However, as described below, it is believed that BOTH of those two different types of resonance can be created, and used to good advantage, in certain types of components, exemplified by the types of spiral coils described herein. Because of how these types of spiral coils operate, it is believed that they can create exceptionally powerful electromagnetic fields.

While it is not yet known for certain (and there are reasons for doubting that this result would occur), it may be that, if two coils are positioned and oriented in a "reinforcing" direction, they may be able to create a very strong electromagnetic field that will drive positively-charged particles in one direction, while driving negatively-charged particles in the opposite direction. If that effect occurs, then such "twin coil" devices could be useful in certain types of machines and systems, such as cathode ray tubes, television receivers, vacuum tubes, medical diagnostic devices, and other types of imaging systems, and in various types of chemical manufacturing, biological research, pharmaceutical purification, and other chemistry-related fields of science. While this possibility should be tested, it appears likely that, because of how a "standing wave" is vertically symmetric, if a spiral coil is flipped over, it may simply have the same effect as in the opposite orientation, unless other modifying components are somehow incorporated into the system.

Accordingly, the primary current focus of the invention herein is to disclose that when two spiral coil discs are positioned close to each other, with their dominant planes parallel, they will generate what will be, in effect, a zone with an effect that can be described as "electromagnetic pressure". Furthermore, because of certain additional factors (including the fact that the "strands" on the outside of a spiral coil are necessarily longer than the "strands" on the inside), it is believed that the type of "electromagnetic pressure" that will be generated by a matched pair of spiral coils, positioned parallel to each other and with a fixed gap between them, will be able to "herd" and "drive" ions or other charged particles into a "center node" that sits between the exact centers of the two coils. Accordingly, that effect can be used to create relatively high concentrations of similarly-charged particles that otherwise would repel each other, in the "center node" of a reactor that is formed by two parallel spiral discs.

Because of the power and importance of resonance in electric devices, this type of "electromagnetic pressure" may be able to operate at any of three levels of increasingly higher power.

At the lowest power level, various types of conventional chemical reactions and biological purifications involve ions, which are called cations when positively charged, or anions when negatively charged. Both types of ions are released by acids, alkalis, salts, and various other chemicals. Accordingly, if ions can be "herded" and "driven" into zones of relatively high concentration, such as at the center of a spiral disc reactor, reactions involving those types of charged particles might be accelerated or otherwise enhanced, even at low temperatures.

The next higher level of power involves a gaseous matter called "plasma" (which must not be confused with blood plasma). When gases are heated (or otherwise treated very to a point where large numbers of electrons are stripped off of the nuclei to which they normally belong, the resulting matter is called a "plasma". Plasma generators are commercially available, from companies such as Hotek Technologies Inc. (hotektech.com), MKS Instruments (mksinst.com). and Kurt J. Lesker Company (lesker.com), typically at costs of several thousand dollars each. Some of these types of plasma discharge units are used to create extremely hot gases that can be used to weld, etch, or clean metals; other can be used to vaporize metals, for purposes such as atomic analysis, or a coating process called "sputter coating".

At the most extreme power levels, if the spiral discs disclosed herein are increased in both size and power to sufficient levels, it appears that they can generate electromagnetic fields that will be strong enough to sustain the fusion of hydrogen into helium, in ways that have never yet been accomplished by so-called "tokamak" reactors. Fusion research involving tokamak reactors has now been going on continuously for more than 50 years, and it has consumed countless billions of dollars in research funds, from governments (and therefore taxpayers) around the world. However, more than 50 years of research on tokamak reactors still has never created even a single instance of net power output, where the amount of energy released by hydrogen-to-helium fusion, in a tokamak reactor, was greater than the amount of energy required to conduct that test.

That is a tragic result, because of the extraordinary promise and potential of fusion reactors, if they could only be created. If they can be created, then fusion reactors could generate very large quantities of electric power, with two crucially important advantages. First, a fusion reactor would not require, create, or involve uranium, plutonium, or any other "heavy elements" of a type that create toxic and dangerous radioactive wastes, and that also create fears and threats of uncontrolled nuclear weapons, "dirty bombs", accidental releases, etc. Second, unlike the burning of oil, gas, or coal, fusion power would not release any carbon dioxide or other "greenhouse gases" into the atmosphere.

Although success cannot be assured, the spiral disc reactor design disclosed herein merits very serious consideration and careful testing, to determine whether such discs (in very large sizes, and run at very high power levels) will be able to create and sustain hydrogen-to-helium fusion reactions that will create net power output. Therefore, a brief overview of the art in the field of fusion research, and tokamak reactors, is provided in the next section.

Fusion Reactions and Tokamak Reactors

As used herein, "fusion reactor" refers to a nuclear reactor that fuses light atoms, into heavier elements. For various reasons that arise from the laws of physics, hydrogen (and its isotopes, deuterium and tritium, which for convenience are included in the term "hydrogen" as used herein) is the only element that offers a practical hope of generating electrical power, by fusing hydrogen atoms into helium atoms. That is the same fusion reaction used by the sun and all stars, and by hydrogen bombs (also called thermonuclear bombs). When the term fusion reactor is used herein, the term reactor implies that the reaction will proceed in a device that is not a bomb, and that will not explode or be damaged by the reaction.

Because of the potential for using fusion reactors to generate electrical power without involving dangerous compounds such as uranium and plutonium, thousands of highly skilled physicists have tried for decades to find some way to obtain a "net output" of power, from fusion reactors. "Net output" refers to the amount of power output released by a reactor, minus the amount of power input that had to be put into the reactor, in order to start and drive the reaction. However, despite more than 50 years of research (and countless billions of dollars in funding), no one has ever created a fusion reactor that could generate even a modest net output of power.

The most widely-studied design, for fusion reactors, is usually called a "tokamak", also referred to as a "toroid" (in layman's terms, "a doughnut shape"). The design of tokamak reactors is described and illustrated in a good basic summary article that is readily available on Wikipedia, under the name "tokamak". That introductory article also lists numerous books and articles that provide extensive additional information on how various geometric designs and operating enhancements evolved and led, over the decades, to the current state of the art. However, it must be realized and emphasized that not even a single one of those designs or attempts has ever created a net output of energy, not even in the largest, most advanced, most sophisticated tokamak reactors ever built.

One of the intractable and insurmountable obstacles that has defied all prior efforts to obtain self-sustaining power-producing fusion reactions can be briefly summarized as follows. As temperatures increase, the velocities of the atoms and molecules in a gas increase; indeed, temperature is a direct measure, and index, of how fast the atoms and molecules in a gas are moving, as they collide with and bounce off of each other. Extremely high temperatures (measured and expressed as millions of degrees) are required, in order to put hydrogen gas into a type of "plasma" state or condition where the hydrogen atoms will begin to approach the energy levels they need, in order to fuse with each other when they collide. In this context, the term "plasma" indicates that the hydrogen's electrons are subjected to such high velocities and extreme energy levels that they completely separate from the nuclei of the hydrogen atoms. This creates a dissociated and completely ionized form of the hydrogen gas, with negatively-charged electrons moving at tremendously high speed through the plasma, and with positively-charged nuclei also moving at tremendously high speed through the plasma.

As known to physicists, a conventional hydrogen nucleus is a single proton, with a single positive charge, and no neutrons. In the heavier isotope deuterium (written as $^2H$), a neutron (with a mass equal to 1, but no charge) has become bonded to the proton. That gives the nucleus of a deuterium atom double the mass and weight of normal hydrogen, but it still has a single positive charge. In the still-heavier isotope tritium (written as $^3H$), two neutrons have become bonded to the proton, giving the nucleus a molecular weight of three, still with a single positive charge. Since the momentum, inertia, and kinetic energy of any nucleus that is traveling at extremely high speed will increase as mass increases, the nuclei of the heavier deuterium and tritium isotopes of hydrogen will be able to sustain energy levels that render them much more likely to undergo nuclear fusion, when they collide with each other, compared to the lighter nuclei of ordinary hydrogen (1H). Therefore, any serious effort to create and sustain a fusion reaction will use a hydrogen gas preparation that has been enriched and/or semi-purified to contain a high level of the heavier deuterium and/or tritium isotopes.

Returning to the crucial physical barrier that has thwarted and stymied all research efforts throughout history to create net-power-out fusion reactions, extremely high temperature levels in a fusion reactor lead directly to the problem of low density levels, for the high-speed nuclei inside the reactor. Density and temperature are the two main factors that determine the pressure of a gas or plasma, inside a container. Therefore, for any maximum pressure that can be sustained inside a tokamak reactor, during a fusion test, if the temperatures are driven up to extremely high levels (such as in excess of a million degrees), the density will drop off sharply. That density drop has completely stymied any sustained fusion reactions, in tokamak reactors.

This problem, in turn, arises from the fact that no material that can ever possibly be created will be able to withstand temperatures in excess of a million degrees. The strongest alloys ever created, the strongest ceramics ever created, and even diamonds (or any other solid material) will simply melt and then vaporize, if they even begin to approach temperatures such as a million degrees. The bonds that hold atoms together in metal alloys, ceramics, or even diamonds, will not and cannot withstand temperatures of a million degrees. Therefore, a hydrogen plasma, inside a tokamak reactor, cannot be touched or even approached by any type of solid material. As a result, it can only be held in place by an intensely strong electromagnetic field.

Therefore, a tokamak reactor is a complex machine that tries to create an electromagnetic field which has sufficient intensity and power to create a fusion reaction between extremely high-energy, extremely high-velocity nuclei, which are released when all the electrons are stripped away from the heavy isotopes of hydrogen. However, because of the inherent limitations of the design of tokamak reactors, no tokamak reactor has ever succeeded in actually creating a "net power out" fusion reaction. The Applicant herein is convinced that, no matter how much more tinkering and tweaking is done to the design of tokamak reactors, no tokamak reactor will ever be able to "cross the hump" and supply "net output" power to an electric power grid.

Briefly, a fundamental problem that occurs in all tokamak reactors is that they try to compress extremely hot, extremely fast-moving, positively-charged nuclei into a very narrow "pinched" zone that circles all the way around an endless ring, near the center of the "open tunnel" that is created by the doughnut-shaped containment system. Even when steps are taken to try to create "wrinkles" and other discontinuities in the intense electromagnetic fields inside the circular tunnel, the fact remains that all of the particles continue to race, generally in the same direction, around and around, inside the endless tunnel. Even though the electromagnetic fields that are being applied around the entire periphery of the circular tunnel are doing their best to keep those hydrogen nuclei in the super-intense, super-concentrated "pinch zone" near the center of the tunnel, the heat and energy levels that arise inside that tunnel give those particles extreme, intense, and powerful motivation to veer out of (and away from) the super-intense, super-concentrated zone.

Furthermore, the nuclei of all hydrogen, deuterium, or tritium atoms have positive charges, and as a direct result, they will actively and aggressively be trying to repel each other, and resisting any effort or force that tries to "herd" them together into a high-density zone. As the density of the hydrogen nuclei increases to higher and higher levels, the repulsive forces between those nuclei, in the highest-density zone, also increases to higher and higher levels.

As a result, despite the best efforts of thousands of truly skilled scientists to design and create various types of "patches" and "wrinkles" that can create short-lived focal modifications to the electromagnetic fields inside an open ring-shaped tunnel, there appears to be no way that a never-ending ring-shaped tunnel can overcome the inherent problems and "escape paths" that are unavoidably created by that geometric shape.

Accordingly, a spiral-shaped reactor design is believed to offer an inherently better design. The very nature of the design is that it can herd charged particles to the center of the spiral, and once those particles reach the center node, the shape, structure, and geometry of the spiral discs that surround and enclose them will keep them there, even though still more charged particles continue to arrive, leading to increasing levels of higher and higher particle density, in the center node.

It also should be noted that this type of design is consistent with, and emulates in various ways, a number of types of spirals that occur in nature, including spiral galaxies, hurricanes, and numerous types of vortices.

Although this type of reactor design, using a pair of spiral coils positioned near each other to create a "reactor zone" between them, offers better potential than any tokamak reactor, or other reactor design currently known, for being able to create and sustain the hyper-extreme reaction conditions that will be required to run hydrogen-to-helium nuclear fusion on a continuous "net power out" level, the utility and patentability of this design does not depend on whether it can or cannot create and then sustain nuclear fusion. Instead, as mentioned above, other types of useful chemical reactions (including various types of ionic reactions) can be carried out by this type of processing system. Accordingly, such other reactions are sufficient to establish and support the patentable utility of this reactor design, and research involving such other uses will help indicate whether this reactor design can then be extended to the much more extreme conditions required for nuclear fusion.

Furthermore, it must be noted that a single spiral coil, acting by itself rather than as one of a pair of coils, will be able to create more intense and powerful electromagnetic "standing waves" than any other known type of electrical element, if the coil is designed and suited as described herein to simultaneously create and exploit not just one but two different and compatible types of electrical resonance, when operated at a single resonant frequency. Since even relatively small and compact coils of this nature can emit extremely powerful electromagnetic standing waves or fields, they can be used in any analytical, diagnostic, or other type of equipment or environment where such standing waves or fields can be used productively.

Accordingly, one object of this invention is to disclose a "double-resonant" spiral coil as an electromagnetic component of a larger system, which will operate with two different but simultaneous types of electrical resonance, which involve: (i) quarter-wave resonance, which will create standing electromagnetic waves at a resonant operating frequency; and, (ii) a state of inductive and capacitive balance ("L/C balance"), which will synchronize and align the voltage input cycle and the current response cycle in a radiofrequency circuit, in a manner that reduces impedance within the circuit and creates an increased power factor, increased efficiency, and increased power and work output.

Another object of this invention is to disclose a new and improved design for creating electromagnetic components, devices, and systems, using one or more doubly-resonant spiral discs that can generate localized controllable electromagnetic field densities, with strengths and intensities that have not previously been achievable by prior devices that can be created inexpensively by equipment smaller than an "atom smasher".

Another object of this invention is to disclose a new and improved design for a reactor or effector device that uses two or more spiral coils, in which the electromagnetic fields from the plurality of spiral coils are aligned in a way that allows the device to deflect or otherwise manipulate electrically-charged particles.

Another object of this invention is to disclose charged-particle reactors that contain and include at least one matched pair of spiral coils that will operate at an single operating frequency that simultaneously creates quarter-wave resonance and L/C-balanced resonance, and which generates electromagnetic fields in a reactor zone located between two proximate spiral coils.

Another object of this invention is to establish a reactor design that holds greater potential than tokamak reactors, for creating nuclear fusion in a manner that will generate net power output.

These and other objects of the invention will become more apparent through the following summary, drawings, and detailed description.

SUMMARY OF THE INVENTION

Electromagnetic components and systems are disclosed herein, which use electrical components that will operate with two different but simultaneous types of "resonant" behavior:

(i) "quarter-wave" resonance, in which the length of a wire, antenna, or similar element is equal to ¼ of the wavelength of a radiofrequency alternating voltage that can be established in the component, in a manner which generates an electromagnetic standing wave that has at least one peak node, and at least one null node; and, (ii) balanced inductive/capacitive (L/C) resonance, in which the impedances created by inductance and capacitance become balanced, in a way that synchronizes current response with voltage input, leading to in-phase behavior of a radiofrequency circuit with minimal impedance, optimal power factor, optimized operating efficiency, and optimized power and work output.

One type of component that can operate with both forms of resonance is a spiral coil, in which: (i) the operating frequency that will establish a standing wave is determined mainly by the length of the conductor element (such as a wire ribbon) in the coil; and, (ii) the cross-sectional dimensions (i.e. thickness and width) of the conductor and its insulation are optimized, so that the wire ribbon or other conductive element will establish L/C balance at the length and operating frequency which establish standing waves in that particular coil.

By controlling and optimizing the cross-sectional dimensions of wire ribbons, spiral coils of various sizes can be created that will achieve both types of resonance simultaneously, allowing them to operate with exceptionally high efficiency and power output. When two such coils are placed close to each other, the combined electromagnetic field they will create, in a "reactor zone" between them, will be very powerful. If used to herd and drive charged atoms, molecules, or particles inward, toward a center node between the centers of the spiral discs, they can create high densities that can promote various types of chemical and plasma reactions involving charge particles.

BRIEF DESCRIPTION OF THE DRAWINGS

FIGS. 1-4, which are prior art, illustrate the basic principles behind "standing waves".

FIG. 1 (which includes panels 1A, 1B, and 1C, which are aligned vertically) illustrates what happens when reflected waves (traveling toward the left, in panels 1B and 1C) are superimposed on emitted waves (traveling toward the right, in all three panels), in a wire segment that has a fixed length which is an exact multiple of the wavelength of a radiofrequency voltage that is being pushed into the wire segment by a power supply with a tunable frequency. When the frequency of the RF power supply is adjusted and tuned to the resonant frequency which corresponds to the length of the wire, the combination of emitted and reflected waves creates a "standing wave" condition, which has "peak nodes" and "null nodes".

FIG. 2 illustrates how the same types of standing waves will occur, if the length of a wire is exactly equal to the wavelength of the radiofrequency voltage being created by the power supply.

FIG. 3 illustrates how the same types of standing wave will occur, if the length of a wire is equal to ½ of the wavelength of a radiofrequency voltage.

FIG. 4 illustrates how the same types of standing waves will occur if the length of a wire is equal to ¼ of the wavelength of the AC voltage. Since a ¼-length wire is the shortest wire length that will create a set of "natural and stable" standing waves, this type of standing wave response is commonly called a "quarter-wave" response. It normally is created, in a wire or other conductor segment having a fixed length, by adjusting and "tuning" the frequency of an RF power supply, until the output frequency corresponds to the length of the wire, in a manner that creates a resonant "standing wave", which can be detected by various types of instruments.

DETAILED DESCRIPTION

Figure 1:
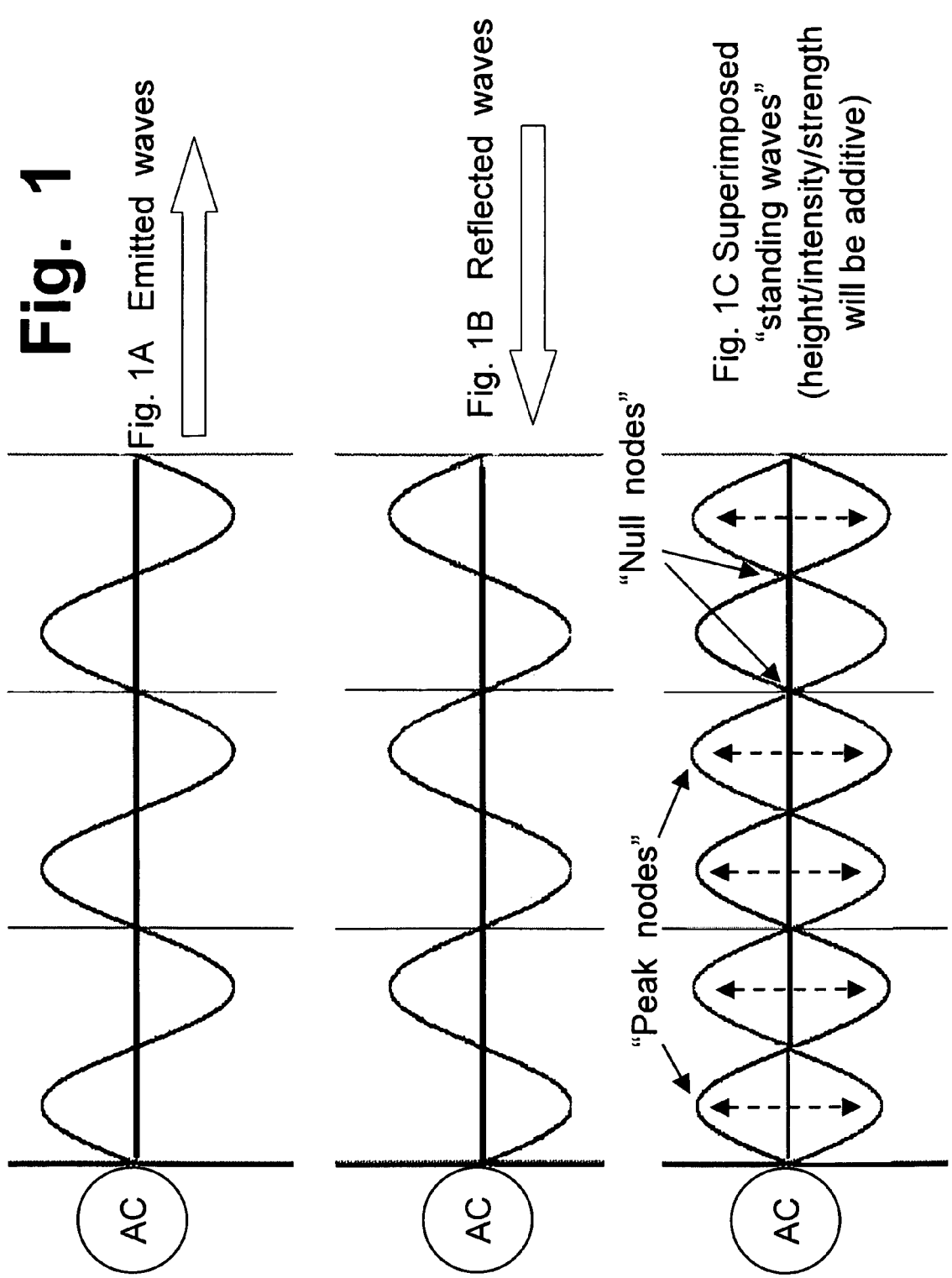
Figure 4:
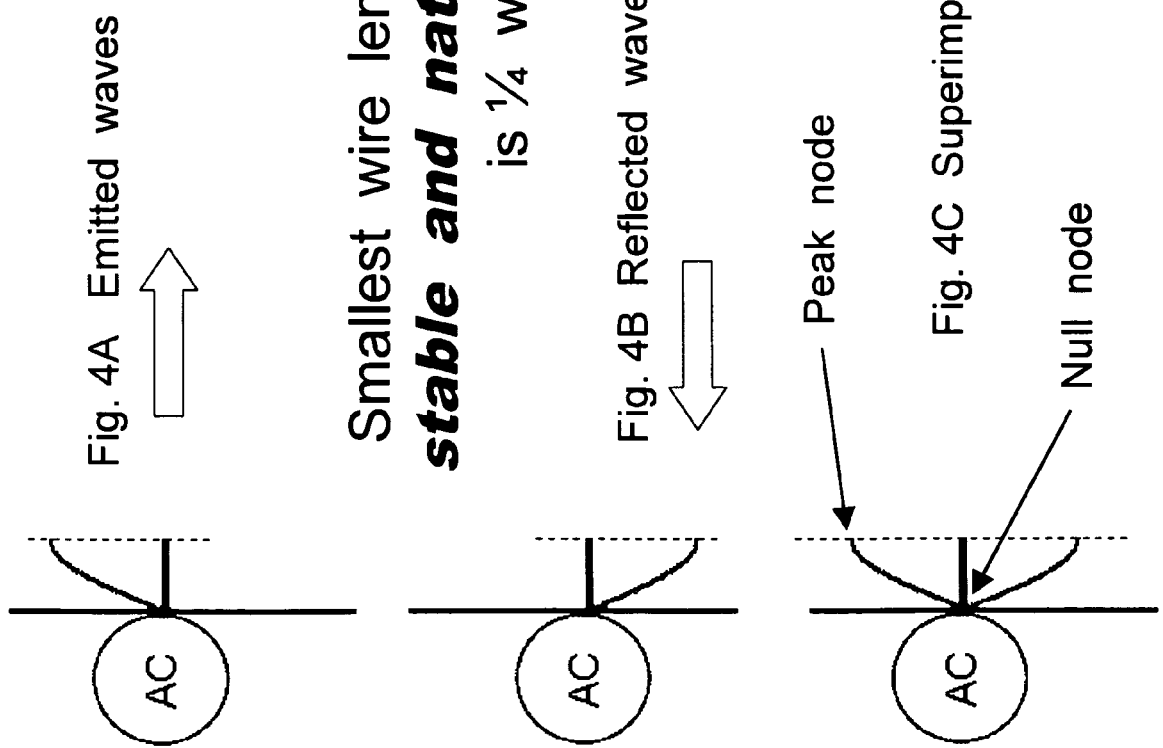

As briefly summarized above, this invention involves spiral coils made of wire (or wire ribbon) having cross-sectional dimensions that have been optimized in a manner that enables a spiral coil to establish and operate with two different but simultaneous types of resonant behavior, referred to herein as:

(i) quarter-wave resonance, in which the length of the wire segment that was used to make the spiral coil is equal to ¼ of the wavelength of an alternating current voltage input, which in most devices of this nature will operate in a frequency somewhere between 10 kHz and 2 MHz, which is conventionally referred to as a "radiofrequency" (RF) voltage range. This type of AC (RF) voltage input can be conveniently provided by adjustable power supply units that can be "tuned" until the output frequency establishes a resonant "standing wave" in the coil.

(ii) inductive/capacitive resonance, also referred to herein as L/C balance or similar terms, which occurs when inductive impedance (which causes a current cycle to lag behind the voltage cycle) and capacitive impedance (which causes a current cycle to lead the voltage cycle) become balanced and cancel out each other, thereby leading to synchronized, aligned, and in-phase current and voltage cycles, which in turn provides an optimal power factor, maximal operating efficiency, and maximal power and work output.

In order to avoid and resolve potential uncertainty over how closely a system should approach a condition of perfect L/C balance, and in order to avoid potential items of unrecognized or unintentional prior art that may be operating in ways that somehow approximate the doubly-resonant devices described herein, the Applicant hereby sets forth two arbitrarily-chosen "benchmark" power factor levels, which are set at 80% and 90% of ideal. If a certain spiral coil has been designed and assembled to a level of quality and performance where its "power factor" is at least 80% of the power factor that could be achieved by perfect synchronization of the voltage and current cycles, then it is deemed to be operating in a state of sufficient L/C balance, and resonance, to be covered by this invention and the claims herein. If its "power factor" is lower than 80%, then it is deemed to not be operating in a state of sufficient L/C balance and resonance to fall within the claims. In addition, the Applicant also hereby sets forth a 90% power factor level, as a preferred benchmark standard that should be met (and preferably surpassed) by any owner or operator that is seriously interested in powerful and optimal performance by devices of this nature.

However, it also must be noted that those arbitrary levels are intended to refer to the potential of an electromechanical system to operate at high power factor levels. In interpreting and enforcing patent claims, the temptation would be extremely powerful for an operating company to create false and misleading test data which fall slightly below any arbitrary level, if and when it knows or believes its performance and output is being analyzed by an entity wishing to enforce patent claims against it; then, as soon as it believes a monitoring session has ended, it can return to improved and optimal operating conditions, while hiding its actions behind agents who will be paid to deny the truth, obfuscate the facts, and mislead anyone attempting to enforce patent rights. Therefore, if a spiral coil system is designed to approach a state of double resonance by using and exploiting the teachings herein, then the ability of an operator to tune and run its system poorly for brief periods, when it is being observed, and then more skillfully and diligently when not being observed, will not remove a properly-designed system that exploits and uses the teachings herein from coverage by the claims below.

Accordingly, when described in terms suited for a patent claim, a device for creating an electromagnetic field is claimed herein, comprising a spiral coil made from a segment of conductive material having a fixed length and cross-sectional shape, wherein:

a. the segment of conductive material is designed and suited to establish a standing electromagnetic field around said spiral coil when one end of the segment of conductive material is excited by an alternating voltage at an operating frequency which corresponds to the fixed length of the segment of conductive material; and, b. said spiral coil has a wound shape and size which will create inductive-capacitive resonance within said spiral coil, when said spiral coil is excited by the operating frequency which establishes a standing electromagnetic field around said spiral coil.

Figure 5:
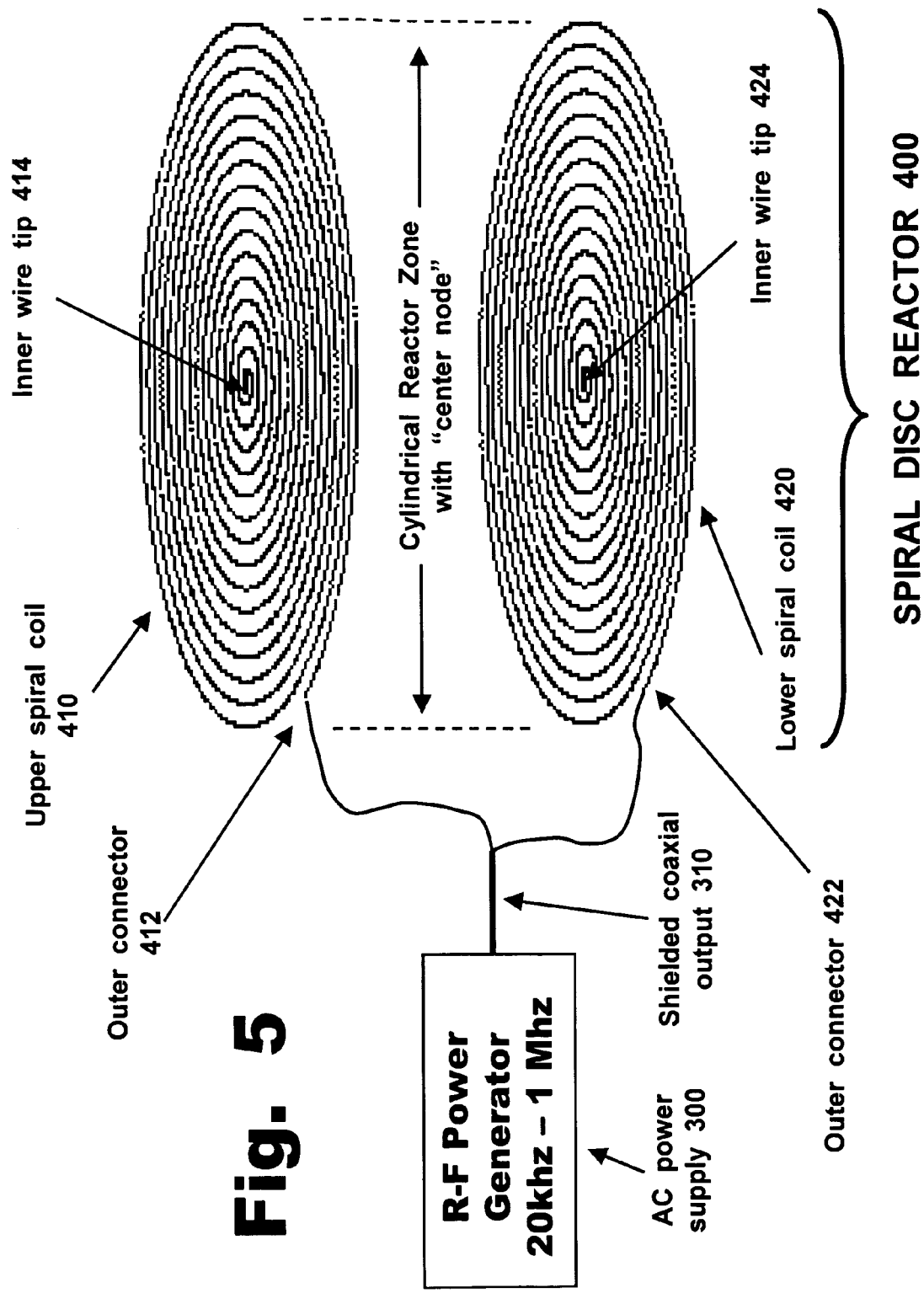
FIG. 5 illustrates a pair of spiral coils and a radiofrequency power supply, which together create a "reactor zone" between the two coils, with standing electromagnetic waves in the reactor zone.

FIG. 5 depicts a pair of spiral coils that are coupled to an RF power generator. Such power supplies are commercially available from various companies. These types of RF power generators must be distinguished from RF signal generators, which can generate very high frequencies, but only at low power levels. Several brands of RF power generators can provide 1 kilowatt or more of output power, at adjustable frequencies ranging up to 1 MHz, in relatively inexpensive mass-manufactured ("off-the-shelf") units, and similar RF power units can be custom-fabricated with higher power levels and/or higher frequency ranges.

As mentioned in the Background section, since a voltage wave travels through a wire at about the speed of light, which is about 300 million meters/second, an RF voltage that operates at 1 million cycles/second (i.e., 1 MHz) has a wavelength of about 300 meters. Therefore, the minimum ribbon length for a spiral coil that can generate a "quarter wave" resonant response, to a 1 Mhz frequency, is 75 meters. Because many electrical systems suffer from distortion and other problems when a system operates at the outer limits of its advertised or rated operating range, the minimum length should be increased to at least about 80 meters (which corresponds to a frequency of about 940 khz), and even more preferably to at least about 90 or 100 meters, if an RF power generator is used which is labeled or rated as being able to provide power at a maximum frequency of 1 Mhz.

This invention is not limited to commercial RF power generators, for driving spiral coils and/or spiral coil reactors as described herein. In particular, a substantial number of people, ranging from university professors and professional electrical engineers, to "hobbyists", have developed various ways to build large and powerful RF power generators, to create things like spectacular displays of electrical arcs. An illustrated summary of the components and circuits they use is available in http://en.wikipedia.org/wiki/RLC_series_circuit, and much more information (including names and contact information for quite a few people who have built and tested these types of circuits, as well as videos showing the results of their work) is available from sites such as teslasociety.com, tesladownunder.com, eskimo.com/~billb/tesla/tesla.html, the Tesla Coil Mailing List at pupman.com, and a site maintained by the Finnish University & Research Network, www.nic.funet.fi/pub/sci/electrical/tesla/. In addition, at least two companies (Tesla Technology Research, ttr.com, and kVA Effects, teslacoil.com) do this type of work professionally, and offer special effects for movies and television shows, presentations at special events, etc.

Accordingly, the AC power supply 300, shown in FIG. 5 as a box that is labeled "R-F Power Generator", can indicate either: (i) a commercially-available system, such as a system with a power output of 1 kilowatt or more and with a tunable frequency range up to at least about 1 MHz; or, (ii) a custom-made system, such as described below.

It is believed and asserted that, for a spiral coil having any particular length that will render the coil useful for creating standing waves as described herein, a set of cross-sectional dimensions for a wire ribbon that will be used to make the coil can be identified, by using the methods described herein, that will enable that particular spiral coil to also achieve L/C balance and resonance, at the same operating frequency which will establish a "standing wave" resonant response in that particular coil. Stated in other words, by using an iterative development process that is described herein, a combination of a suitable length, and suitable cross-sectional dimensions, can be identified, which will be used to manufacture wire ribbons that can be wound into spiral coils, which will then establish and utilize two different but simultaneous types of electrical resonance, to create double-resonant spiral coils that will generate exceptionally powerful electromagnetic fields.

Double-Resonant Spiral Coils and Coil Reactors

As illustrated in FIG. 5, reactor assembly 400 comprises two main components, referred to interchangeably herein as discs, coils, spiral coils, or spirals 410 and 420. They will be positioned apart from each other, with their dominant planes parallel to each other, and with a controllable spacing (or gap, distance, spread, etc.) between them. For convenience, it is presumed that both discs will be oriented horizontally, creating an unambiguous configuration having an upper disc (designated as 410 in FIG. 5), and a lower disc (designated as 420). As with tokamak reactors, horizontal orientation will be preferred for most types of chemical or nuclear reactions, since horizontal orientation can neutralize or at least minimize any unwanted variations that might be caused by gravity, density differentials, etc.

The wire ribbon that forms upper spiral coil 410 will have two ends, designated as outer connector 412, and inner tip 414. The lower coil 420 similarly will have two ends, designated as outer connector 422, and inner tip 424. Each of the outer connectors 412 and 422 will be coupled to a high-frequency AC (RF) power supply, such as a standard commercially-available RF power generator, designated as item 300 in FIG. 5. In a preferred embodiment that is suited for convenient testing, both of the outer connectors 412 and 422 of the two spiral discs 410 and 420 will be coupled to a single power supply 300. In more advanced reactors, it may be preferable to provide a separate power supply for each of the two discs.

In one preferred embodiment, there will not be any electrical component connected to either of the inner wire tips 414 or 424. In alternate designs that merit testing and evaluation, various types of electrical components can be coupled to either or both of those inner wire tips, to enable testing of the effects of any such option type of "inner tip" component on either or both of the two spiral coils. Such optional components might include, for example:

(i) a reflective device in the form of a capacitor or other "cap"-type electronic component, which can be used prevent any sparks, arcs, or other emissions from emerging from a wire tip;

(ii) a polished mirror or similar component, which may have a dome, conical, or other shape, and which can physically reflect electromagnetic radiation that otherwise might emerge from the innermost center of the reactor zone; and/or, (iii) a power supply that is coupled to the inner tip of the wire ribbon that creates the spiral coil, and that has tunable frequency controls that can be used to match and supplement the frequency being emitted by the main power supply that is coupled to either or both of the outer connectors 412 or 422. If desired, any electrical component that is coupled to inner tip 414 of upper coil 410 can utilize a connector component that will rise vertically above the dominant plane of coil 410, or at any other angle with respect to the dominant plane of the coil.

If desired, either or both of the spiral coils can be designed, assembled, and tested with a relatively small gap in the center of the coil. Such a gap may be able to increase the "pressure" that is imposed on charged particles that are reacting in the very center of the reactive zone, by effectively providing them with an ideally-positioned "corral"-type aggregating zone or node. For example, coils having center-gap diameters that are 1%, 2%, 3%, and 5% of the total diameter of the upper coil 410 can be created and tested, to determine whether the presence of such a gap, in the center of a spiral disc, will increase the field pressures, particle densities, or other relevant effects that can generated at the center of the reactor field. Such gaps can be created in a controlled and reproducible manner by commencing the spiral "wrapping process" around suitable devices, such as the bases of drill bits that have an assortment of known and controlled diameters.

Alternately or additionally, as noted above, a "planar-plus" disc design can be used, which will include and provide a dome-shaped, cone-shaped, or other nonplanar component, positioned at or directly above the center of the disc. Any such center component can be electrically coupled to the coil that forms the main disc, or to a different but synchronized power supply. Alternately, a reflector can be provided, to collect any waves that emerge from the reactor zone, and reflect those waves back into the reactor. These types of reflectors (which can have parabolic or other desired shapes) may help trap and retain radiant energy that is being released by a reaction, to help sustain a desired reaction.

The upper and lower coils 410 and 420 must be operated in a synchronized manner that will establish "standing electromagnetic waves" in a "reactor zone" between the two discs, as indicated in FIG. 5. This can be most easily and directly accomplished (and tested, during the development and optimization of a set of coils have a specific set of dimensions) by coupling the upper and lower coils 410 and 420 to a single high-frequency power supply, using two connectors (which also can be called leads, wires, conduits, or similar terms) that have identical lengths, and that are connected to the same location on an output connector 310 which emerges from the RF power generator 300, as shown in FIG. 5.

While it is not entirely clear from the prior art, the Applicant's study and analysis of various items of prior art, in other related fields, indicates that the standing electromagnetic waves that will be generated inside the reactor zone can be manipulated in a way that will create a form of "field pressure" or "electromagnetic pressure". That type of "field pressure" will be manifested in three different ways:

(i) the two spiral discs will begin trying to repel each other, in ways that can be measured directly as force or pressure that will attempt to push the discs away from each other;

(ii) if the voltage and power levels from the power supply are raised to relatively high levels, the air (or other controlled gas) between the two spiral coils will begin displaying "coronal discharges" that will begin moving in visible patterns within the reactor zone; and, (iii) the fields will begin to "herd" and "drive" any charged particles that are inside the reactor zone, into a "center node", which will be a roughly spherical or cylindrical zone that will be positioned between the center-points of the two spiral discs.

The existence of a single focused "center node", in the center of a reactor field created by two spirals, should be directly contrasted with the doughnut-shaped "ring" design of tokamak reactors, which have never succeeded in creating even a single "net output power" fusion reaction despite 50 years of trying. One of the inherent problems of tokamak reactors is that they will always and unavoidably provide a never-ending ring-shaped "escape" pathway, for charged particles that are being driven and herded together into a high-density zone.

In any hydrogen fusion reaction (as mentioned above, as used herein, the term "hydrogen" includes the deuterium and tritium isotopes of hydrogen), the hydrogen nuclei that are being herded together will all be positively charged. As a direct result, they will actively repel each other, and they will actively resist any effort and any force that tries to "herd" them together into a high-density zone. In a tokamak reactor, that high-density zone is shaped like an endless ring, which does not create a geometric structure that is well-suited to creating a high-density, high-compression zone. As a result, despite the best efforts by thousands of truly skilled scientists to design and create various types of "patches" and "wrinkles" that can create short-lived focal modifications to the electromagnetic fields inside the "endless ring" of a tokamak, no tokamak reactor, anywhere on earth, at any time, has ever created a "net power out" event, despite more than 50 years of trying.

Accordingly, a spiral-shaped reactor is believed to offer an inherently better design. The very nature of the spiral design enables it to drive and "herd" charged particles into the center of the spiral. Once those particles reach the center node, the shape, structure, and geometry of the spiral discs that surround and enclose them will keep them there, even though still more charged particles will continue to arrive (from a controllable supply source, described below), leading to increasing levels of higher and higher particle density in the center node.

As a result, this type of spiral reactor design appears to offer both: (i) an improved and highly efficient design for conventional chemical reactors that can handle ions and other charged particles, at low or moderate temperatures; and, (ii) a high level of promise for being able to achieve and sustain the hyper-extreme reaction conditions that will be required to create "net power out" nuclear fusion reactions. Furthermore, this structure, model, and approach is entirely consistent with a number of lessons and examples provided by spirals nature, such as spiral galaxies, hurricanes, and numerous types of vortices.

In any initial tests, the distance between the two discs 410 and 420 should be controllable (or adjustable, tunable, etc.), over a range that will allow interactions between the two discs to be evaluated, beginning a substantial distance apart (such as 2 meters or more). After a first set of test results (at several different test voltages) have been obtained at the initial distance, the discs will be moved closer together for subsequent tests. Depending on how the two coils are mounted, this can use stepwise decrements, with testing opportunities at each new distance, or "continuous" closure methods can be used, while various measurements of field strengths can also be taken continuously.

In some uses, it may be preferable or necessary to change the distance between discs 410 and 420 while a charged-particle reaction is proceeding; for example, this may provide a useful control mechanism for triggering, accelerating, decelerating, and/or terminating a reaction. Accordingly, at least one type of mechanism should be provided that will allow adjustments and modifications to the spacing between the two discs, both before a reaction begins, and while a reaction proceeds, as a form of "tuning"-type control, or as a governing, throttling, or other mechanism that will allow greater control over a reaction that is proceeding between the two discs.

To enable these types of manipulations, each of the two spiral coils should be mounted and supported in a manner that will allow controlled manipulation and spacing of the "holding plates" that are used to support and secure the wire coils. This can be done by mounting the coils in "sandwich"-type arrangement, between two plates or other segments of a material that is effectively transparent to electromagnetic fields, such as a clear acrylic-type plastic.

Each spiral coil will be made of an electrically conductive material, such as:

(1) a pipe, which implies a hollow cross-sectional shape, which can be round, elliptical, square, rectangular, etc.;

(2) a wire, which implies a solid cross-sectional shape, usually but not necessarily round. If a relatively flat cross-section is used, it can be called a ribbon, strap, tape, flatwire, etc.; these remain within the definition of "wire" as used herein.

(3) any other elongated piece of conductive material having a controlled cross-sectional shape, such as an angled (acute, right, or obtuse) shape, or a "beaded", ridged, rippled, grooved, or other non-smooth surface shape, any of which can be designed to either: (i) allow a coil to be packed tightly together, or, (ii) maintain a desired spacing between adjacent layers.

In most reactors that will be of interest for the uses disclosed herein, a presumption arises that the preferred type of wire is likely to have a flattened cross-section, in order to enable a spiral coil's inductance to be balanced out against the coil's capacitance. As described in the Background section, in an AC system, inductance causes a current cycle to lag behind a voltage cycle, while capacitance causes the current cycle lead the voltage cycle. Therefore, if those two types of "impedance" are evenly balanced against each other, the "leading" and "lagging" time-shifts caused by those two different types of impedance will neutralize, balance, and cancel out each other, leading to a desired condition referred to herein as "L/C balance". When that "sweet spot" is reached, four desirable effects are accomplished: (i) the "total impedance" of the system drops to a minimum; (ii) the current cycle and voltage cycle become synchronized; (iii) the "power factor" (which is an index of efficiency) rises; and (iv) the power output of the system increases. Since all of those results are desirable, a resonant or resonating condition is said to occur, when L/C balance is achieved.

In AC circuits that operate at "radio-frequency" levels (conventionally defined to include all frequencies greater than 10 kHz), inductance usually rises, and capacitance usually decreases, as an excitation frequency increases. Therefore, in some types of circuits that are able to operate at a range of different frequencies, the inductance and capacitance curves will cross (on a graph) as a function of operating frequency. If and when the circuit operates at that frequency, the system will begin operating in an L/C-balanced resonant state.

However, in the types of spiral coils of interest herein, the preferred operating frequency for any particular coil will be constrained by (and likely will be entirely determined and controlled by) the need for that particular to operate at a fixed frequency, which will be required to establish quarter-wave (or standing wave) resonance in that particular coil. As described in the Background section, that type of quarter-wave resonance depends almost exclusively and entirely on the length of the wire segment that was used to make a coil. Accordingly, since that parameter or feature of a coil can be regarded and treated as a fixed and determinate quantity for some particular coil, the system, method, components, and approach described herein are intended to enable the identification and optimization of the cross-sectional dimensions of a "wire ribbon" (i.e., the thickness(es) and width(s) of the metal wire, and of an insulating layer that will surround and enclose the metal wire) that can be used to create a coil that can provide L/C balance and resonance, while operating at a specific frequency that will become fixed and unchangeable, once the length of the wire segment that is wound into the spiral coil has been determined, fixed, and finalized. This can be done by identifying and using optimal cross-sectional dimensions, for a wire ribbon that will have a fixed length in a coil. As used herein, any references to cross-sectional dimensions, when applied to a wire ribbon, refer to:

(i) the thickness, width, and exact cross-sectional shape of the metal conductor, as described below; and, (ii) the thickness, width, and exact cross-sectional shape of any layer of insulating material that is used to surround and enclosed the strand or metal in the wire.

As used herein, the width of a wire, ribbon, or other metal conductor will be its widest cross-sectional dimension, while its thickness will be the smaller dimension.

Wires that have cross-sectional shapes that are not round can be called flatwires, ribbons, tapes, straps, etc. The terms "flatwire" and "ribbon" imply different manufacturing processes. In conventional industry terminology, as understood by the Applicant, "flatwire" implies that a wire was initially manufactured with a round cross-section; then, the round wire was subsequently passed through a press, to flatten the malleable metal to an "aspect ratio" (a thickness-to-width ratio) such as 1:2, 1:3, or 1:4. By contrast, the term "ribbon" (used interchangeably with "wire ribbon") implies that hot molten metal was extruded through a "die head" having an orifice with the desired final shape, so that no subsequent "pressing" operation was required.

Even in a malleable metal such as copper, the passage of a round wire through a press, to distort and alter the shape of the wire, is likely to create microscopic fractures, fissures, and other "discontinuities" in the pressed wire. Even if such discontinuities are only molecular in size and are undetectable by conventional methods, they can become "focal points" for adverse events in operations involving high voltages and high frequencies. Therefore, wire ribbons (i.e., formed by shaped extruder heads) are presumed to be preferred for testing and use as described herein, rather than "flatwires" (i.e., wires that were created with round shapes, and then flattened by a press). It also should be noted that any insulating layer should not be applied, until after the shaping process has been completed.

In accord with that preference, the discussion herein avoids the term "flatwire", and instead uses the term "ribbon", for convenience, to refer to any type of flattened wire (including cold-pressed flatwire, if people choose to use it as described herein, despite its potential problems and risks). Such ribbons, made from high-grade oxygen-free copper and insulated with any type and thickness of coating that a customer specifies, can be custom-fabricated in any size specified by a customer, by supply companies that specialize in these types of products, such as REA Wire (www.reawire.com), HM Wire International (www.hmwire.com), and Alpha-Core (www.alphacore.com).

Furthermore, if a need and a demand arises, companies that manufacture high-grade copper wire can also use known methods (such as electroplating, sputter-coating, etc.) to apply a thin layer of a conductive alloy (such as nickel-iron mixtures, as described in Tian et al 1998) to the outer surface of a copper ribbon, before a layer of insulation is added on top of the alloy coating. Such alloy coatings are believed to improve certain types of "skin behaviors" that are seen when complex or high-frequency loads are imposed on uncoated conductors.

Because of certain phenomena described in the Background section and illustrated in FIGS. 1-4, any spiral coil having a length that is of interest herein will have a "quarter-wave" resonant frequency that can generate "standing waves". That "standing wave" frequency will be determined mainly by the length of the ribbon contained in the coil. For example, a spiral coil made of a wire ribbon that is 100 meters long will create a standing-wave response to a wavelength of 400 meters; that number is determined by simply multiplying the length of the wire, by the number 4, since "quarter-wave" behavior is involved. Then, since the speed of a voltage wave through a wire is 300 million meters per second, a wire length of 400 meters corresponds to a "resonant" or "standing wave" frequency of 750 khz. If the length of the wire segment in a coil increases to 150 meters, the resonant wavelength will increase to 600 meters, which corresponds to a frequency of 500 khz; and, if the length of the spiral coil increases to 200 meters, the resonant wavelength will be 800 meters, which corresponds to a frequency of 375 khz. Those coil lengths (ranging from roughly 100 to 200 meters long) are practical and reasonable, for low-cost testing of spiral coils as described herein, and a frequency range that extends from about 300 to about 800 khz is also practical and reasonable, for testing and analyzing various cross-sectional dimensions, for wire ribbons that can be used to create spiral coils for charged-particle reactors as disclosed herein.

As described in the Background section, inductance increases as a function of the number of loops in a coil, while capacitance increases as a function of the area of metal surfaces that are positioned close to each other. As a result, inductance will be higher than capacitance, in the tightly-wound inner strands of a spiral coil, and therefore, inductance can "jump out to an early lead" as a spiral coil is being created. Subsequently, as the diameter of the spiral coil grows larger, the length (and therefore the surface area) of each additional strand will increase. This will lead to an increase in the "marginal capacitance" that will be added to the coil, by each additional strand, as the coil grows larger.

Figure 6:
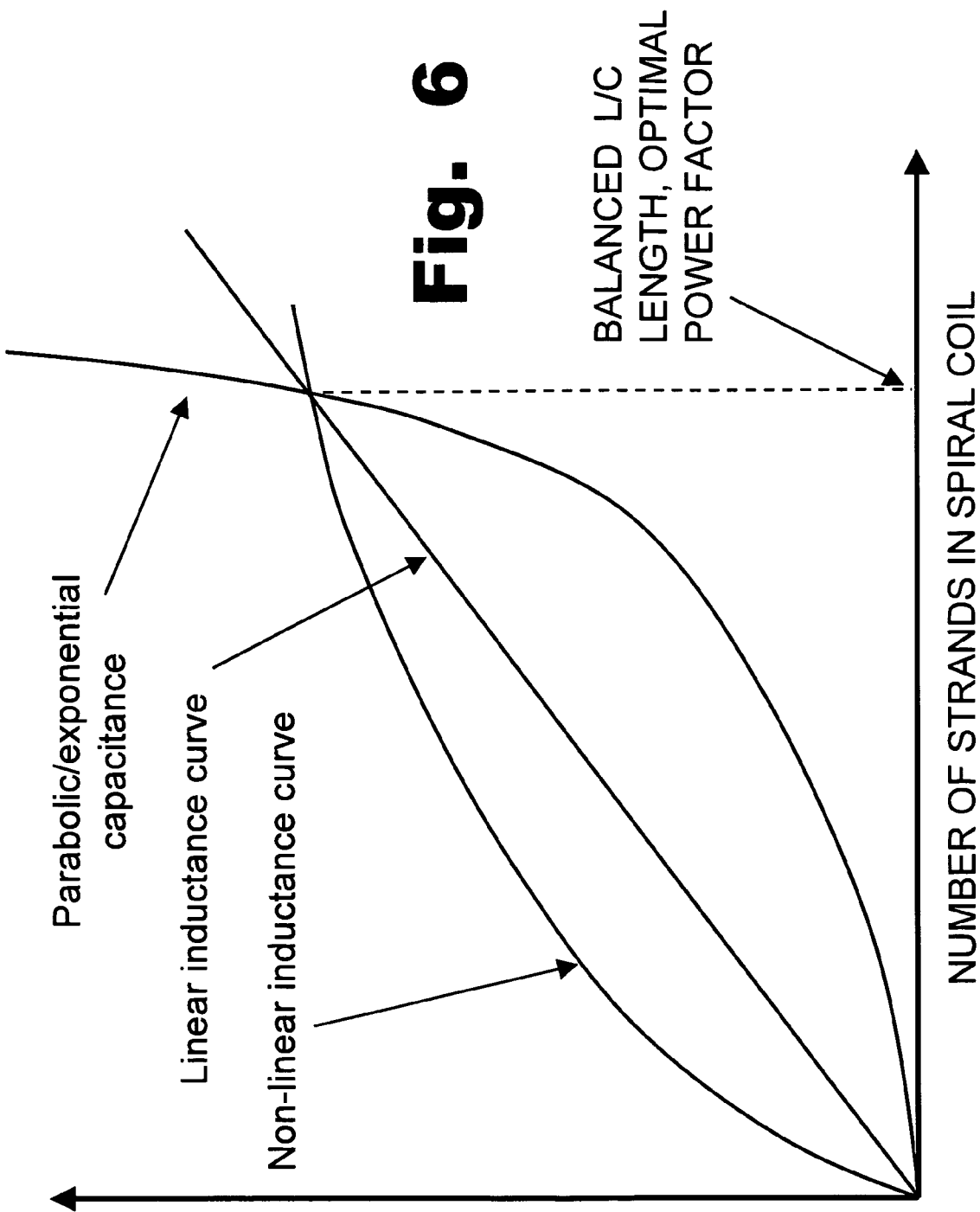
FIG. 6 is a graph, indicating how capacitance and inductance will both increase, as the length of a "wire ribbon" that is used to make a spiral coil increases. Inductance will "jump out to an early lead" in the inner strands, since those inner strands will be coiled fairly tightly. However, after the length of the wire ribbon in the spiral reaches a crossover point, the increase in capacitance, for each additional strand in the spiral, will exceed the increase in inductance. This difference in the shapes and slopes of the capacitance and inductance curves will cause those two curves to cross each other, at some coil length which will depend on the cross-sectional dimensions of the wire ribbon used to make the coil. At that length, the inductive impedance (which causes a current cycle to "lag behind" a voltage cycle) and the capacitive impedance (which has the opposite effect, and which causes the current cycle to "lead" the voltage cycle) will become balanced, and will neutralize each other and cancel out. When that type of L/C balance is achieved within a spiral coil, the voltage and current cycles will become aligned and synchronized; the total impedance of the coil will drop to an "ohmic resistance" minimum; the power factor will reach a maximal level; and the efficiency, power output, and work output of the coil will all increase to maximal levels.

As a result, as indicated by the "archetype graph" in FIG. 6 (which assumes that a single fixed operating frequency is being used, which will be determined by the resonant frequency that generates "standing waves" in the spiral coil), the capacitance curve will have a mildly parabolic or exponential function, which will gradually increase to a steeper and steeper slope, as the length of the ribbon used to make a spiral coil increases.

The inductance curve for a specific spiral coil may have a generally linear shape, or an "incrementally declining" shape, as the ribbon length and coil diameter increase. Regardless of which type of curve is created, as a function of ribbon length in a particular spiral coil, the increase in the inductance that will be created, by each additional strand in the coil, will not increase to the same extent that the capacitance will increase. Accordingly, a "crossover" point will arise where the inductance curve and the capacitance curves will necessarily cross each other, as a directly result of the two facts outlined above (i.e., inductance will jump out to an early lead, but after some particular length for any spiral coil having dimensions of interest, capacitance will increase more rapidly than inductance, as additional strands are added to the coil). Therefore, the inductance and capacitance curves will inevitably cross each other, at some point on a graph which corresponds to a certain ribbon length.

An important factor that will enable "double resonant" operation to be achieved by the types of spiral coils disclosed herein arises from the fact that inductance and capacitance levels, in a spiral coil, can be governed and controlled by controlling the cross-sectional shape of the wire ribbon that will be used to make a coil.

In general, inductance levels are not very sensitive to the "aspect ratio" of a wire ribbon (aspect ratio refers to the ratio of thickness, to width). As a result, different wire ribbons with rectangular or square cross-sectional areas of 1 mm$^2$ will create approximately the same inductance levels, regardless of whether their dimensions are 0.1×10 mm (i.e., a thin ribbon with a width of 1 centimeter, having an aspect ratio of 100:1), 0.2×5 mm (with an aspect ratio of 25:1), 0.5×2 mm (aspect ratio 4:1), or 1×1 mm (aspect ratio 1:1).

By contrast, the surface areas of closely-positioned metal surfaces are the most important factor in determining capacitance. Therefore, even though any of the 1 mm$^2$ wire shapes listed above will create similar level of inductance, a ribbon with a width of 10 mm (and a thickness of 0.1 mm) will create about 5 times as much capacitance, when wound into a large spiral coil, as a ribbon having a width of only 2 mm (and a thickness of 0.5 mm).

Accordingly, by controlling the cross-sectional dimensions, "aspect ratio", and cross-sectional shape of a wire (and also by controlling the thickness and possibly the shape of an insulating layer that coats a wire ribbon), it is possible to control the inductive-capacitive curves that will be created when a spiral coil is wound from a wire ribbon, in a way that will cause the inductance and capacitance to be balanced, and therefore optimal, in a spiral coil that has (i) a known and fixed ribbon length, and (ii) an operating frequency that will be fixed and unchangeable, in order to generate standing waves in a spiral coil made from a wire segment having a fixed length.

Figure 7:
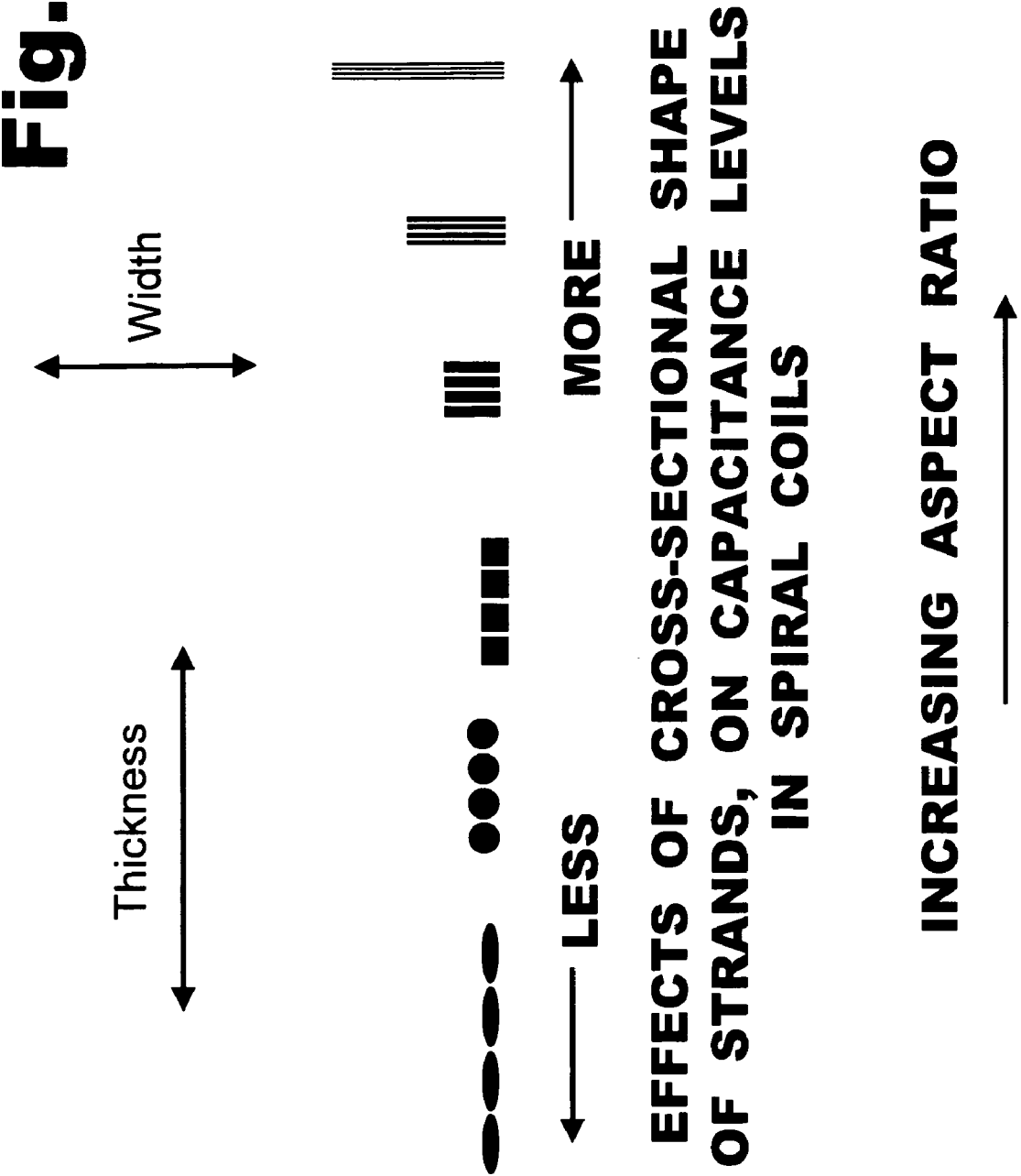
FIG. 7 illustrates how various different cross-sectional shapes and "aspect ratios", for a wire ribbon having a fixed cross-sectional area, can be used to either increase, or decrease, the capacitance levels in a spiral coil made from such ribbons. This allows the cross-sectional dimensions of a wire ribbon to be optimized, in a manner that will achieve an L/C balance, in a spiral coil which has a fixed length that will determine the resonant "standing wave" operating frequency for that coil.

The effects of cross-sectional shape and "aspect ratio", on the capacitance levels that will be created by spiral coils made from different types of wire ribbons, are illustrated in FIG. 7. In that illustration, each cluster of four identical shapes depicts how adjacent strands would be packed together, in a spiral coil that is resting on a flat horizontal surface. As a result, the "thickness" dimension will be horizontal, while the "width" dimension will be vertical. The widths and aspect ratios increase, in the progression of clusters from left to right in FIG. 7 (except for the round and square cross-sections, which both have aspect ratios of 1:1).

In general, if a higher level of capacitance will be required in order to achieve L/C-balanced resonance, in a spiral coil having a fixed length, then the aspect ratio of the wire ribbon that is used to make that coil can be increased, by specifying and purchasing a spool of wire ribbon that has greater width, and less thickness, than a ribbon with less-than-adequate capacitance.

Alternately, moving in the other direction (toward lower aspect ratios, and lower capacitance), if ribbons with completely square cross-sections (which will have 1:1 aspect ratios) provide still too much capacitance in a relatively long coil (which may have a length of multiple hundreds of meters), then round (or semi-round) wires having the same cross-sectional area can be tested. If even those have too much capacitance, then any of several approaches can be used, such as any of the following (or any combination thereof):

(1) applying a thicker layer of insulation around either the entire ribbon, or around some portion of the length of a ribbon; in addition, different types of insulating materials, having different "dielectric constants", can be applied to different portions of a wire, to reduce the capacitance that will be created by the relatively long outer strands of a spiral coil;

(b) A wire ribbon having a rectangular, ellipsoid, or other cross-sectional shape with an aspect ratio that is not 1:1 can be formed into a spiral coil in a way which orients the wire in: (i) a first orientation that causes "tight packing" of the strands that form the center of the coil, to create greater inductance levels formed by the tightly-packed inner region; and, (ii) a different orientation which is rotated a quarter-turn away from the "tight packing" orientation, after a "transition length" has been reached in the coil, so that the outer portion of the coil will have a "loose packing" arrangement that creates reduced capacitance in the outer coils.

(c) A spiral coil can be formed from a wire ribbon that has two or more different cross-sectional dimensions. For example, a copper wire can be manufactured by extruding semi-molten copper through a "die head" with a rectangular orifice created by two fixed plates, and two adjustable plates. After a predetermined length of ribbon has been extruded with a relatively high aspect ratio (i.e., with narrow thickness and wide width), which will create a relatively high level of inductance in the tightly-packed inner strands of a spiral coil, the thickness-controlling adjustable plate in the die head can be "loosened", to allow the ribbon thickness to increase, while the width-controlling adjustable plate in the die head can also be "tightened", if desired, to reduce the width of the subsequent length of ribbon. This will create a controllable length of ribbon having an initially high aspect ratio, followed by any desired number of subsequent "zones" of ribbon having one or more lower aspect ratios. The desired adjustments in the adjustable plates (which will control the dimensions of the extrusion orifice, during an extrusion process) can be controlled by rotation of threaded screw devices, and the rotation of the plate-control screws that will govern the cross-sectional dimensions of the ribbon, along its length, can be controlled by a programmable automated control system, to allow any desired dimensions to be created, with each set of dimensions applied to any desired length of ribbon, if a custom-manufactured ribbon of this nature is desired. If that type of approach is used, gradual transitions between different aspect ratios should be used, to avoid creating any "shoulder"-type discontinuities that might create unwanted "reflections" of voltage waves passing through the ribbon.

The goal of any of these approaches will be to determine the desired cross-sectional dimensions of a wire ribbon that will create a spiral coil that will be "double resonant". As used herein, the term "double resonant" indicates that a coil will have both of two different types of resonance:

(i) standing wave resonance, at an operating frequency that is within a range that will create electromagnetic fields having a desired level of power and intensity; and, (ii) inductive-capacitive (L/C) resonance, where inductance and capacitance balance and cancel out each other, to enable a current response cycle to be synchronized with a voltage excitation cycle, to provide an optimal "power factor" and maximal power output.

The effects of sealing agents should also be considered. A common practice, among Tesla coil enthusiasts, is to use an insulating adhesive (such as hot-melt glue, epoxy, polyurethane, or acrylic sealers) to affix the windings to a form, to prevent loosening. Since any such agent will have some dielectric constant, which can affect capacitance, a researcher who is testing spiral coils should select a particular type of sealer, and become familiar with how it will affect the performance of a spiral coil. This can be done, for example, by testing a small coil (such as an 80 meter coil, as described elsewhere herein) initially without any sealer, and then again, after a coating of sealer has been applied. In general, a liquid sealer should be applied until the ridges and valleys formed by the windings are filled, creating a relatively smooth surface with a high gloss. This will help suppress corona losses, prevent electrical breakdowns and shorting between strands, and make a coil more mechanically durable, to help protect it from scratching or other physical damage. It will also allow a coil to be submerged into various types of liquids, which can offer benefits in certain situations, in a manner comparable to voltage transformers that have coils submerged in liquids.

Based on prior experience, the Applicant herein would recommend consistent use of a clear epoxy that contains no filler, created by mixing two agents immediately before they are applied, for spiral coils as described herein, once the desired range of targeted lengths and cross-sectional dimensions is known. Such epoxies (with comparative information on various formulations) are available from sources such as www.epoxyproducts.com. During initial testing, sealers that allow softening (such as by applying mild heat to a hot-melt glue), and sealers that cure into relatively soft final form (such as rubber cement; silicone sealers generally should be avoided, since they contain acetic acid as a curing agent) may be preferred, since they can allow adjustments (such as length trimming) to be made more easily and conveniently even after a sealer has fully cured.

Mounting Spiral Discs in Paired Arrangements

The comments in this section provide guidance for anyone who wishes to assemble and test a set of coils, at minimal cost, before deciding whether to invest in more expensive mounting, support, and measuring equipment. These are the types of recommendations that can allow skilled artisans who have spent years experimenting with Tesla coils, as a form of amusement and "research" that is not likely to lead to professional use or commercial profit, to begin testing these types of spiral disc reactors (and to begin gathering useful data on such reactors) in garages, basements, or similar types of workshops. In addition, these types of low-cost arrangements can enable interested workers, students, or others to do low-cost initial testing, in the type of after-hours and off-budget "skunk works" that often arise when intelligent people begin to sniff something interesting and challenging in the air; those types of initial low-cost efforts often lead to results and prototypes that can convince managers or professors that a project has serious potential and is worth careful study and serious funding.

Accordingly, anyone who is considering assembling a spiral coil reactor system as described herein should be at least aware of the following recommendations and options:

1. The lower coil should not be placed on a concrete floor, since minerals in the sand and pebbles that are used in concrete, and any steel reinforcing bars that may be embedded in the concrete, can divert electromagnetic fields in ways that can reduce field strength and create anomalies. If wooden tables or similar devices are used for support, they should not be held together by metal screws or nails, which can create distortions and anomalies even if they do not drain away significant energy. If a table or other support platform is used to raised the lower spiral disc above a concrete floor, the height of that platform preferably should be at least about 3 feet, to properly "insulate" any electromagnetic fields created by the coils, from potential unwanted distortions created by the concrete.

2. Various known materials that fall within the "clear plastic or resin" (or opaque ceramic) categories are effectively transparent to electromagnetic fields. Such materials include most types of clear polycarbonates and acrylics. These types of materials can be used to create plates or platforms that are up to several meters in diameter. By using suitable securing means (such as large threaded screws and wingnuts made of nylon or other suitable material which is transparent to electromagnetic fields), a pair of such platforms, in a "sandwich holder", can be used to trap and securely hold a planar spiral coil having any desired diameter.

3. A convenient way to create an inexpensive "sandwich holder" that can be used for the types of tests described herein can use the following steps:

a. Make or buy a total of four "platform" discs with round shapes, made of polycarbonate, acrylic, or other material that is transparent to electromagnetic fields. Two of the discs should be thick (such as at least ½ inch), strong, and sturdy, since they will become load-bearing discs that may be subjected to large forces and stresses. The smaller discs, which will only be used to secure the spiral coils to the larger discs, will not need to withstand large forces or stresses, and can be thinner, such as ¼ or ⅜ inch thick.

The larger and heavier discs should have diameters that are larger than the smaller discs by at least about 4 inches, and the smaller discs should also be slightly larger than the largest spiral coils that will be tested, with additional room to allow threaded bolts or other clamping devices to be affixed to a small disc while it holds a coil. Accordingly, for example, a 48×96 inch sheet of new acrylic, ¾ inch thick, can be ordered and delivered as an "off-the-shelf" item, and it can be cut (preferably at a factory or distributor, to reduce shipping bulk and costs) into two large discs, 48 inches in diameter. Those would accommodate smaller discs with 44 inch diameters, which in turn would allow testing of spiral coils more than a full meter in diameter.

In general, wood is not preferred for this type of testing, because its water content will respond to RF waves, in a manner comparable to microwave cooking However, certain known types of wood (such as Sitka spruce) have relatively low water content, and if they are exposed to RF waves (or heated to mildly elevated temperatures) for sustained periods of time (such as overnight) in a moving-air atmosphere, nearly all of the water that can come out will be driven out, leaving behind a dried wood that may be acceptable for at least some types of tests.

b. Drill nine moderate-sized holes, with diameters about ½ inch, around the periphery of at least one of the larger discs, which will hold the upper spiral coil, suspended in mid-air by a set of strong anchored belts. If the lower disc also will be suspended in mid-air by belts, it can be treated the same way. The holes around the rim of any disc that is drilled should be spaced evenly apart (i.e., 40 degrees apart, measured from the centerpoint), with the centers of the drilled holes at least about 1.5 inches in from the outer edge of the disc. Assign a number (1 through 9) to each hole.

c. Get 9 suitable lengths (explained below) of a relatively wide yet bendable nylon belt, such as a 2" belt. After it has been stretched under moderate tension (such as about 100 pounds of tensile force), it should have essentially no additional stretchability, or "give"; that factor makes belts better suited than ropes, for this type of use. Insert one end of each segment of belt through a hole, and tie the belt securely to the rim of the clear disc, at that location.

d. The other ends of the three belts that pass through holes 1, 4, and 7 will be affixed to spaced-apart attachment points at strong and reinforced locations above the platform (such as large eyebolts that have been screwed into wooden joists, or bolted to steel components of a building frame). The other ends of the three belts that pass through holes 2, 5, and 8 will be affixed to spaced-apart attachment points at strong and reinforced locations below the platform, presumably affixed to the floor of the room. The other ends of the three belts that pass through holes 3, 6, and 9 will be affixed to spaced-apart attachment points at "lateral" locations around the platform; these can be located vertically above or below the suspended platform, to some extent, so long as they will still provide strong and powerful resistance against any lateral vibrations, bucking, or other motions.

e. To provide a suitable mechanism for adjusting the lengths and tensions on all nine belts (this type of adjustment is necessary to establish a completely horizontal alignment, regardless of platform height), the "far end" (i.e., the non-platform-end) of each belt can be securely tied to one end of a length-adjusting and tensioning device, such as a conventional "turnbuckle", of the type that can be purchased at any hardware store. This type of device has two "eyebolts", one with a right-hand-threaded shaft, and the other with a left-hand-threaded shaft. The shafts of both eyebolts are screwed into the two ends of an elongated connector, so that when the connector is rotated, it will either tighten or loosen a belt that is coupled to that turnbuckle. These types of "turnbuckle" devices can provide fine-tuning length and tension adjustment capability, which will accompany and supplement the types of "approximating" attachments that can be created by the skilled use of knots, ratcheting "come-along" pullers, etc.

f. If desired, the three belts that are affixed to holes 2, 5, and 8 on the platform (the "descending" belts") also can be coupled to "strain gauges" or any other devices that will measure tensile force. The tension on those three belts can be calibrated, to allow them to determine the amount of lifting force being exerted on the upper spiral coil during a test, by measuring the tension imposed on each of the three strain gauges, when a known level of force is trying to lift up the suspended platform. The calibration tests can use, for example, a large barrel that is filled with successively greater amounts of water, and then weighed (or calculated) after each additional quantity of water is poured into the barrel. A simple pulley system will allow the barrel to be suspended from a rope. The rope will rise up to a first pulley located above the barrel, then travel horizontally to a second pulley mounted above the suspended platform, and then descend to the platform, where it will be tied to the center strap of a harness that is secured to at least three of the holes that were drilled through the platform.

Alternately, that type of "strain gauge" calibration will be unnecessary, if the lower spiral coil is mounted on a platform with adjustable height, which can measure the downward pressures exerted against the lower coil, as it is raised up closer (either gradually, or stepwise) to a stationary and non-moving upper coil.

The range of "gap distances" (or spacings) that can be measured in this manner will be limited by the height of the room or other indoor facility where the coils are being tested. The height of a conventional room (without a concrete floor) will allow starting "gaps" of about 2 meters; taller rooms (such as in warehouses) can enable greater testing distances. However, rather than requiring large initial spacings for safe initial tests of large and powerful discs, an alternate approach can simply use voltage levels that start out low, and which gradually escalate, as a substitute for the largest initial spacings that would otherwise be tested.

Testing Program for Single and Paired Coils

The testing program described herein is not the only approach that can be used to gather data that will enable the development of "double resonant" spiral coils. Nevertheless, it offers a logical and low-cost approach to gathering useful data, and anyone planning these types of tests should be at least aware of the logic and reasoning that shapes and supports the recommendations herein.

For the purposes of discussion herein, it is assumed that during the initial stages of testing, spools of wire ribbon, made of high-grade oxygen-free copper, will be ordered in initial lengths of 600 meters, so that two different sets of paired spiral coils can be made from each spool. An initial pair of small coils will be made, with each coil made of a ribbon that preferably should be 80 meters long. As described in the Background section, a wire that is 80 meters long will have "quarter-wave" resonance with a wavelength of 320 meters, which corresponds to a frequency of about 940 khz. That frequency can be achieved by any conventional RF power generator with a frequency range that goes up to 1 Mhz, and such units are common and relatively standard. Therefore, an 80 meter length provides a convenient and useful length for allowing valid data comparisons, regardless of whether different testers use commercial RF power generators, or custom-made power systems made by Tesla Coil enthusiasts.

If a spool of ribbon initially contains 600 meters of ribbon, it will allow the assembly of both: (1) a first pair of small coils, with lengths of 80 meters each; and, (2) a second pair of large coils, with ribbon lengths that will start at 220 meters each. A first cluster of data can be gathered from those larger paired coils, starting at 220 yard lengths. After the initial data sets have been gathered, any desired length of ribbon (such as 10 or 20 meters, per step) can be removed from the outer tips of both of the two coils. This will allow subsequent tests to be performed, at each length in a series of lengths, such as at 200, 180, 160, and 140 meter lengths.

During each test of any such coils, regardless of length, the following tests should be carried out on each of the two coils that will form a matched pair:

(i) Standing wave frequency. This can be measured by using a technique known as "grid dipping", described in sources such as http://en.wikipedia.org/wiki/Grid_dip_oscillator).

(ii) Capacitance and inductance levels. Static tests can be performed easily, using standard capacitance and inductance meters. Dynamic testing over a range of frequencies is more complex, and should focus in particular on the frequency that generates standing waves in a particular coil having a fixed length.

(iii) The extent (measured in degrees, where a complete sine wave corresponds to 360 degrees) to which a voltage input cycle, and a current response cycle, are out of alignment with each other, when a certain coil is operated at the frequency which generates standing waves in that coil. This test should also determine whether the current response cycle leads, or lags, the voltage input cycle.

(iv) "Coil quality factors", as discussed below; and, (v) Electromagnetic field strength of a single operating coil, measured above and below the coil, both: (a) along the vertical center, above and below the coil, at a series of successive distances, such as every 10 cm; and (b) at a series of "radial" distances from the center axis (such as every 10 cm out, radially, from the center axis), at each successive 10 cm height that is measured.

In addition, each pair of essentially identical coils should be tested together, while operating as a pair, at a series of successively closer distances (or gaps). During each test, at each "gap" distance that is tested, the two most important measurements will be:

(i) electromagnetic field strengths, which can be measured as described below; and, (ii) the total repulsive force that the two discs will generate, at varying distances.

As these types of "data clusters" are created, using both single and paired coils made from a single ribbon having consistent cross-sectional dimensions at a series of different lengths, data patterns will emerge that will become useful as additional data are gathered, using other ribbons having different cross-sectional dimensions.

In addition, particular attention should be paid to any data which indicate whether, and by how much, the voltage cycle and the current response cycle are out of phase with each other, at each of a series of coil lengths, as a long coil is trimmed down to shorter lengths and then tested again. Those "out-of-phase" data points should be plotted on a graph, where the coil length is used as the horizontal axis. When that graph is studied, the shape and slope of the curve that results may indicate that the voltage cycle and current cycle of a certain "test coil" will become synchronized, creating an L/C balance and a resonant state, at a certain ribbon length where the "out-of-synchrony" value crosses the horizontal axis. If that appears to be the case, then the indicated "optimal" ribbon length should be approached cautiously, using smaller lengths for each successive cut that trims the remaining coil closer to an apparently-resonant length. That length, if it can be "landed on" (or "nailed", or similar terms), will create the type of "double-resonant" spiral coil that is of primary interest herein. If two such paired coils, each having "double-resonant" behavior at the same operating frequency, are created as a matched pair, any additional trimming operations should stop, and all data subsequently gathered using that pair of coils will merit special attention and careful analysis.

Figure 8:
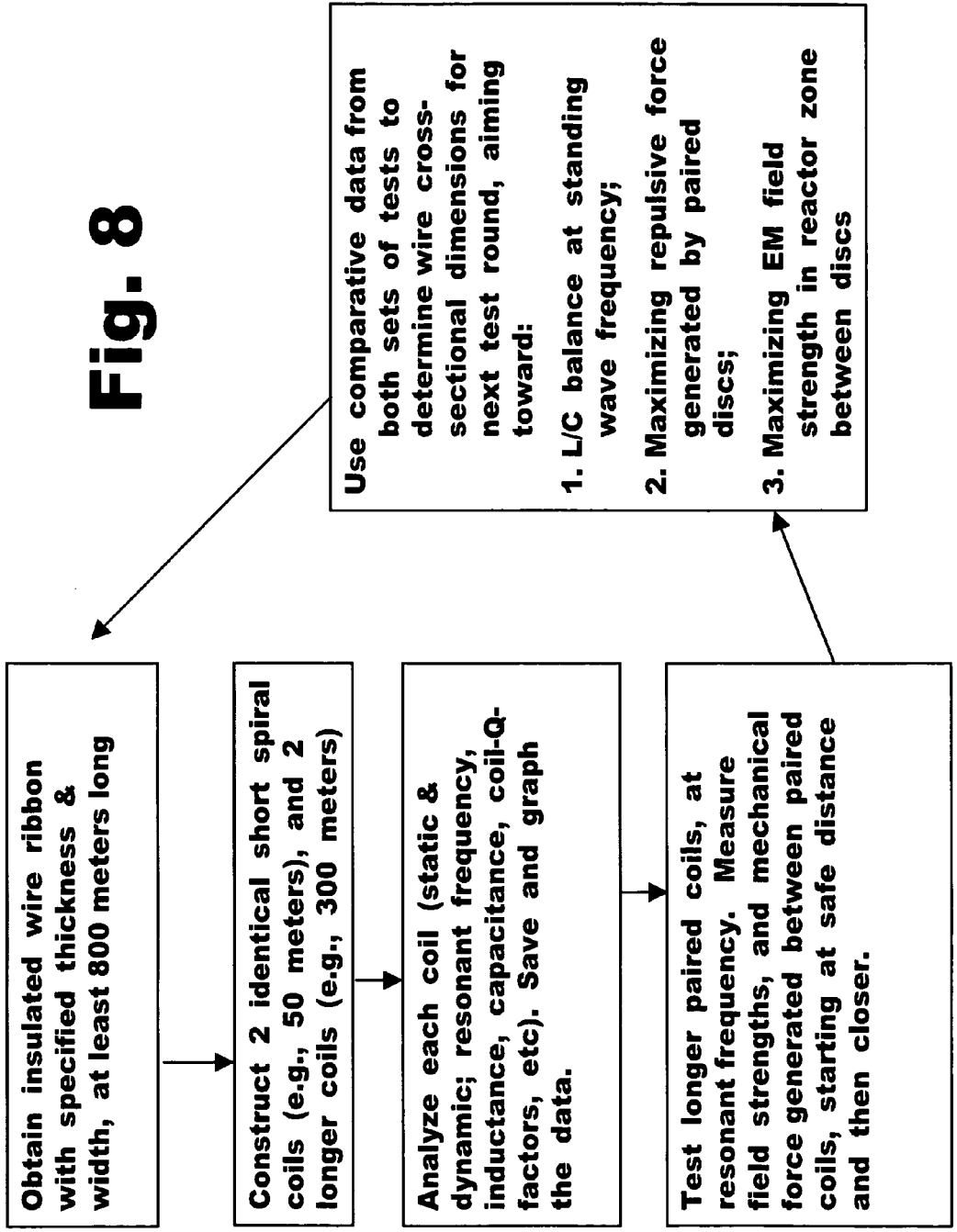
FIG. 8 is a flow chart describing the major steps in an iterative development cycle that enables the cross-sectional dimensions for a wire ribbon to be optimized, in a manner that will enable a spiral coil having a fixed length (and a corresponding operating frequency that establishes an electromagnetic "standing wave" in the coil) to also simultaneously achieve L/C balance at that frequency, which will create an optimal power factor, and maximal power and work output, thereby creating a spiral coil that exploits two different but simultaneous types of electromagnetic resonance, in a manner that creates an exceptionally powerful doubly-resonant electromagnetic standing wave.

As described above and as illustrated in FIG. 7, the cross-sectional dimensions (the thickness and width, both of the conductor and of the insulating layer) of a wire ribbon will affects its capacitance levels. Therefore, after a small pair of coils, and a large pair of coils, from a single spool of ribbon, have both been fully tested, the researcher and/or research team should evaluate all of the data that were gathered, and then decide on the cross-sectional dimensions of the next wire ribbon that will ordered for the next round of tests, as indicated by FIG. 8.

Measuring Field Strengths

When a set of paired spiral coils is being tested at each of several "gap" distances and at a range of voltages for each distance, the electromagnetic field strengths within the "reactor zone" in any test preferably should be measured both: (a) at the exact center position, along an imaginary "vertical axis" between the aligned centers of the two coils, and (b) at a series of distances (such as every 10 cm) away from the "vertical axis", along a radial line.

In a preferred approach to taking a single set of such measurements, the active tip or locus of a gauss meter can be affixed to a pole, bar, rope, or similar support device made of a plastic, resinous, or other material that is transparent to electromagnetic fields. The pole, rope, or similar supporting device should be supported, on both sides of the "reactor zone" (i.e., the imaginary vertical cylinder established by the outer rims of the paired horizontal discs, as indicated in FIG. 5) by pulleys, rollers, winches, or any other suitable device that will allow the gauss meter tip (supported by the pole, rope, etc.) to be moved, continuously and smoothly, from one side of the reactor zone, through its exact center, to the other side of the reactor zone, with surplus room (such as two meters) on both lateral sides of the reactor zone, in the travel path of the instrument tip. As the gauss meter tip travels through the reactor zone, electromagnetic field strengths should be measured continuously, and should be recorded, in a way that will allow the data to be correlated with distances from the center axis of the reactor zone. This can be facilitated by placing measuring marks at fixed distances along the pole, rope, etc.

The most important "horizontal run" that will be made, for any "gap" distance between two spiral coils that are spaced apart from each other, will be at a vertical midpoint, halfway between the two spiral coils. If desired, additional measurements can be made at any other heights, to determine whether field strengths are higher at any other positions along a vertical axis. For example, measurements can be made at 10%, 30%, 50%, 70%, and 90% height levels between the two discs. If any of those readings suggest that a "local maximum" value might exist at any height other than the midpoint (or halfway, equidistant, etc.) height, additional readings can be taken to determine where any such "local maximum" values are located. This can be done by adjusting the heights of the pulleys, rollers, winches, or any support devices, which will be positioned a safe and ample distance outside the "reactor zone".

If a lab is properly equipped, all of these types of horizontal measurements, done at a single fixed height or a series of heights, can be carried out using meter-support components that can be controlled and adjusted automatically, by a person working in a control room or booth. Alternately, if any person must enter the room to make any adjustments at any time during a measuring process, the voltage being supplied to the discs should be reduced, and/or the operating frequency can be shifted away from the resonant frequency, to reduce the strengths and intensities of any fields inside the room while a person is in the room.

If desired, assemblies and measurements can be facilitated by the use of "laser level" devices, which emit a "sweeping laser beam" that has a flat planar appearance. The plane of sweeping light can be oriented either horizontally or vertically, and a "bubble gauge" can be used to ensure that either orientation is exact. If two such laser level emitters are positioned in substantially different locations in a room, vertical beams from both devices can be used to ensure that the discs are properly and exactly aligned (vertically), and that the gauss meter will pass through the exact center of the reactor zone.

During any such series of tests, various adjustments can be performed, to more carefully align the performance of two different coils with each other. For example, if two paired coils that are believed to have approximately the same ribbon length have a significant discrepancy in their "standing wave resonance" frequencies, then short segments of ribbon can be trimmed off of the coil that has the lower resonant frequency. This choice of which coil should will be trimmed arises from the fact that, as the length of a wire is reduced, the "standing wave" frequency will increase. This type of trimming operation should be performed until the "standing wave" frequency of the coil being trimmed matches the standing wave frequency of the other coil. That frequency will then be used as a "starting point" (or "presumptive frequency"), to drive both spiral coils when they are operated as a pair; however, a range of frequencies, both above and below the "presumptive frequency", also should be tested, to determine whether the presence of a nearby active coil will alter the standing wave behavior of either or both of the coils.

Similarly, after a maximum field strength has been established for a paired set of coils, the coils should be tested to determine whether the field strength will be affected if one of the coils is partially rotated about a vertical center axis, while the other coil is held stationary. In the types of belt-mounted early testing envisioned herein, as described above, the upper coil is likely to be suspended from ceiling mounts or similar attachments that will not be suited for convenient rotation, and the lower coil is likely to offer a better candidate for either "slow continuous" or "stepwise" rotation while field strengths are being measured.

Coil Quality Factors ("Q-Factors"); Other Considerations

Since numerous different types of coils play essential roles in a wide range of electric devices (ranging from basic motors and generators, up through extremely complex and sophisticated imaging and diagnostic machines, such as "magnetic resonant imaging" (MRI) machines), an entire field of art has emerged for analyzing and diagnosing the behavior and performance of various types of coils, for various intended uses. This field of art is most commonly referred to by phrases such as quality analysis, quality factor analysis, coil quality factor, or Q factor. It uses and requires both "static analysis" (which typically involves "direct current" measurements of factors such as resistance, impedance, internal capacitance, etc.), and "dynamic analysis" (which involves coil responses to alternating currents at various frequencies, as analyzed by devices such as oscilloscopes, etc.).

Those who are interested in this type of coil analysis can obtain more information on the types of data that are gathered, and what those data mean and imply, from various sources, such as the Tesla Coil organizations and activists who can be located through various websites listed above. There also are professional consulting companies that perform those types of analysis for a fee basis (such as the Coil-Q Corporation, www.coilqcorp.com).

It also should be noted that a simple measurement provides a generally good and convenient indicator of coil quality, in most cases. A suitable type of ammeter can be used to measure the amount of current that is flowing through the conductive lead between an RF power supply and a spiral coil. The desired type of ammeter, initially developed for analyzing antenna performance, will enable a measuring device to be placed around a conductive lead, without requiring any disruptions or alterations to the lead. As a general rule, a higher level of current flow, into and through a coil, will indicate a better quality factor for that coil.

This type of testing and development might be aided by the help of computer models, since straightforward physical laws, and atom and electron behavior, are the main factors that will be involved. However, two factors should be noted. First, the current state of any known and publicly available computer models that might be applied to spiral coils is not especially advanced, and is not even believed to be adequate, as this application is being written. Second, the testing and performance of metal ribbons of any particular size can be affected by minor variations in the thickness of the insulating layers that cover the metal ribbons. Therefore, data need to be gathered from actual testing and comparison of a number of spiral coils having "reasonable candidate" cross-sections and lengths.

The types of tests that should be performed, in order to determine optimal width, thickness, shape, and length combinations for the wire ribbons that will be used to create spiral coils having desired diameters and frequency responses, are described elsewhere herein. The general approach to such tests also is shown in a flowchart format, in FIG. 8. This proposed program for testing is not the only approach that can be used to "zero in" on a suitable set of dimensions (including the width, thickness, and length of the insulated ribbon that will be used) for a charged-particle reactor disc; however, this approach can maximize the "richness" of the data that can be gathered from a relatively inexpensive set of early tests.

Various other arrangements also should be tested, to identify the best approaches and adjustments for maximizing a compressive-type electromagnetic field in the center of a reactor. In particular, it is not yet clear which of two possible approaches will provide the best results when two different reactors coils, closely adjacent to each other, are being operated in a synchronized manner.

In one approach, two completely identical discs are positioned parallel to each other, in a manner which provides both coils with either: (i) a "right-handed" winding (which looks counterclockwise, in the "outer to inner" direction, when viewed from above); or, (ii) a "left-handed" winding (which looks clockwise, in the "outer to inner" direction, when viewed from above). As known to scientists, engineers, plumbers, and handymen, the terms "right-handed" or "left-handed" indicate which way an outstretched thumb will point, when the fingers of that hand are curled and closed.

In a second arrangement, the two discs will have different and opposing orientations (i.e., one will be "right-handed", while the other will be "left-handed"). This can be accomplished by simply "flipping" over one of the discs, like a pancake.

It should also be noted that various types of responses, by paired spiral coils as described herein, will become readily visible, when filtered but otherwise unprocessed air is used as a "responsive gas" that is being subjected to the fields and forces created within a reactor zone operating at a fairly high power, under resonating conditions.

The reference to "filtered but otherwise unprocessed air" refers to air that has been passed through a simple filter (made of air, cloth, or any other suitable filtering material) to remove airborne dust and other particulates. Even that type of simple filtering step is not essential, since unfiltered air will behave in essentially the same manner; however, airborne dust tends to be attracted to the components of any electronic system that generates and emits electromagnetic fields, and filtering helps keep the equipment clean. As a result, most people who do this type of work in garages, basements, and workshops typically use "HEPA" air filtering (which requires standardized and relatively inexpensive high-performance filters), and also keep an electrostatic precipitator or air cleaner running, somewhere in their garage, basement, shop, or lab. Industrial and academic researchers who work in well-funded labs normally use more elaborate and expensive methods (such as, for example, sealed "clean suits", often called "bunny suits", for any workers who enter the room).

Accordingly, any references herein to "air" implies air that preferably has been filtered and/or passed through an electrostatic precipitator or similar device, to remove dust.

If desired, the devices and reactors described herein can be tested in air-tight chambers that contain an enriched, concentrated, or purified gas that will emit various types of visible light that can easily be seen, videotaped, and quantitatively measured for brightness. Such gases include neon, and the types of gaseous mixtures used to fill fluorescent lights.

When a set of reactor discs as described herein is run at a sufficiently high voltage and a resonant RF frequency, in an atmosphere of filtered but unprocessed air, the following types of visible reactions occur, which can be readily seen through the gap between two discs:

(1) A "corona glow" typically is the first visible response that occurs, when a voltage level is gradually "dialed up" to a point that begins to create visible excitation in air. This type of "corona glow" is usually a "soft bluish" color, and it indicates that various types of molecular interactions are beginning to occur, which typically will involve production of ozone and several nitrogenous oxides;

(2) As the voltage continues to be "dialed up" to higher levels, the "corona glow" will intensify and brighten, and will tend to shift from a "soft blue" tint, to a brighter white color. The production of ozone and nitrous oxides will increase substantially, to a point where they usually need to be removed from the room, by an exhaust fan and ductwork, to protect anyone in the MOM.

(3) As the voltage continues to be "dialed up" to even higher levels, gaseous plasma begins to be formed, characterized by a much brighter and stronger blue-white light. By the time plasma is being formed inside a reactor, nearby electrical conductors usually will begin glowing with a corona-type glow.

(4) By the time gaseous plasma is being created inside a reactor, electric arcs are likely to form, including arcs outside the reactor discs. For example, in early tests of these types of reactors, arcs were observed, which jumped from the top surface of the upper spiral disc, to the electrical conduit that was delivering high-frequency electrical power from the transformer to the reactor.

(5) Typically, if voltage levels are increased to still greater levels, the components of the electrical system will be seriously and even severely tested. At that point, low-cost off-the-shelf components tend to fail.

It also should be noted that by the time a gaseous plasma is being created, the electrical system will be emitting large levels of electromagnetic emissions, including X-rays at levels that would be medically dangerous to any unprotected observer. Therefore, steps need to be taken to provide any workers or observers with protection against such radiation, as well as protection against any blasts, explosions, kickbacks, or other unwanted events.

Based on early tests of the types of reactor discs disclosed herein, it is believed that high-intensity and high-density "trapping" and "compression" of charged particles can be achieved by a set of two spiral-shaped reactor discs, regardless of whether:

(i) the discs are horizontally stacked with an identical winding orientation, with both discs having either a right-handed spiral, or a left-handed spiral; or, (ii) the two discs have opposite and opposing orientations, with one disc having a right-handed spiral while the other has a left-handed spiral.

However, it is also suspected and anticipated that testing will show that one "paired orientation" will provide results that are better than the other "paired orientation". By way of analogy, when two speakers are being driven by a stereo amplifier, and are playing the different "left" and "right" channels of a song recorded in stereo, most types of music, in most types of rooms, will still sound about the same, regardless of whether the two speakers have the same "polarity", or opposite "polarity". However, an audiophile who is standing in an otherwise quiet room and listening to a favorite recording of classical music can usually tell the difference, and one "polarity" setting will sound better than the other setting. Similarly, nearly anyone can hear the difference when listening to headphones; one "polarity" will sound better, more pleasing, and more "harmonious" than the other "polarity". Furthermore, when better speakers (or headphones) are used and tested, the differences become even more clear and obvious.

In an analogous way, it is likely that testing will reveal that one particular "paired orientation" arrangement, for a pair of spiral-shaped reactor discs as disclosed herein, will perform somewhat better than the other type of "paired orientation", in a high-quality system that is strong enough, stable enough, and sturdy enough to operate at high energy levels, and that can withstand the types of kickbacks, surges, and other adverse events that will occur as voltage and power levels are pushed to high or very high levels.

Based upon the design of the spiral reactor described herein, it is assumed for purposes of discussion herein that a single main node will be created, at the center of the spiral. However, that may not always be the case in all types of reactors, and additional or alternate field nodes may also be created, which may be either transient or stable, and which may be either stationery or moving (or which might become either stationery or movable, in a manner that can be controlled by adjusting the frequency of the voltage being delivered to the coil). For example, a moving "field node" might travel down the entire length of a spiral, until it reaches and merges with the center node; alternately, a "field node" might intermittently jump from a position that correlates with a certain "strand" (or cluster of strands) in the spiral, to a new position that correlates with the "next smaller" strand (or "adjacent interior" strand, or "adjacent interior" cluster of strands) in the spiral.

Injector Nozzles; Upstream Processing

As understood by most chemists and engineers, most chemical processes use either "batch" or "continuous flow" reaction conditions. As implied by the name, a "batch" reaction involves emplacing a set (or batch) of starting reagent(s) inside a reactor of some sort, closing and/or sealing the reactor (if necessary), performing the reaction for a suitable combination of time, temperature, and pressure (additional reagents can be added during the course of the reaction, if desired), and then removing the product(s) from the reactor.

By contrast, as also indicated by the name, a "continuous flow" reaction involves a reactor that allows fresh reagents to continuously enter the reactor while treated products continuously emerge from the reactor.

Various "hybrid" or "partial" arrangements and permutations are also used, such as in a continuous flow reactor that needs to be shut down intermittently, so that one or more regular and predictable "maintenance" operations can be performed. As examples, either a main product or a secondary byproduct may need to be collected and removed; unwanted residues that accumulate gradually may need to be cleaned out; or certain types of reagent cartridges, catalysts, or other items that become fouled, exhausted, or unusable over time, may need to be replaced.

A general presumption arises that batch reactors are well-suited for early testing, while continuous flow reactors are usually more efficient and profitable for large-scale or other commercial operations. Accordingly, when a spiral disc reactor is used as disclosed herein, it likely will be necessary to provide some type of "injector nozzle" that can add fresh reagents to the reactor, to keep the reaction going over a sustained period of time. This can be done by using various components and designs that will become apparent to those skilled in the art, depending on the type of compound or reagent that is being injected. In general, three presumptions will arise, and should be considered when any type of reagent injector system is being designed, either for testing or for commercial or industrial use.

First, the tip of the nozzle likely should be made of a material that is transparent to electromagnetic waves (such as polycarbonate or other hard plastic or resinous materials), so that the nozzle tip can be positioned partly within the reactor zone, to help ensure that all charged particles which emerge from the nozzle tip will be able to "cross any humps" that may exist around the periphery of the reactor zone, and will actually enter the reactor zone, so that they can begin moving toward the center node of the reactor.

Secondly, charged particles should be pumped to the nozzle tip via a conduit (such as a flexible plastic hose, or a rigid resinous pipe) that is transparent to electromagnetic waves, at a velocity which ensures that the particles emerge from the nozzle tip with enough momentum and inertia to "cross any humps" that may exist around the periphery of the reactor zone, enter the central portion of the reactor zone, and begin moving toward the center node of the reactor.

Finally, since these reactors will be best-suited for creating high densities of charged particles, serious consideration should be given to including, within a complete reactor system, one or more types of "upstream" equipment that will create purified (or at least concentrated and enriched) quantities of the desired type(s) of charged particles, while minimizing the entry, into the reactor, of undesired charged particles.

For example, if a desired reaction involves positively-charged ions or nuclei, then the charged ions or nuclei that form the "feedstock" for the reactor can be initially created in one or more upstream devices, and the resulting stream of positively-charged feedstock material can then be separated from electrons, negatively-charged anions, or other unwanted species, by passing the mixture through a suitable separation device. For example, a conduit that passes through an electromagnetic or other "sorting field" can be used to split a raw or mixed stream into a positively-charged stream (which will be sent into a spiral disc reactor), and a negatively-charged stream (which can be diverted into any suitable collection and handling device or system, such as a neutralizing, trapping, or disposal system.

Similarly, if two different types of positively-charged ions, nuclei, or other atoms, molecules, or particles are present in a "semi-processed feedstock" stream, and only one of those species is desired for entry into a spiral coil reactor, any other type of suitable separation system (which might use, for example, differentials in mass, momentum, charge density, etc.) can be used to purify or at least enrich the desired feedstock compound that will enter a spiral disc reactor, while minimizing the quantity of unwanted contaminants that enter the reactor.

RF Power Generators

As mentioned above, rather than using a conventional and commercially-available RF power supply to drive a single spiral coil (or a paired spiral coil reactor), people who are skilled in the art, and who are familiar with arc discharge systems that use "Tesla coil" technology, can create custom-made RF power supply systems.

Figure 9:
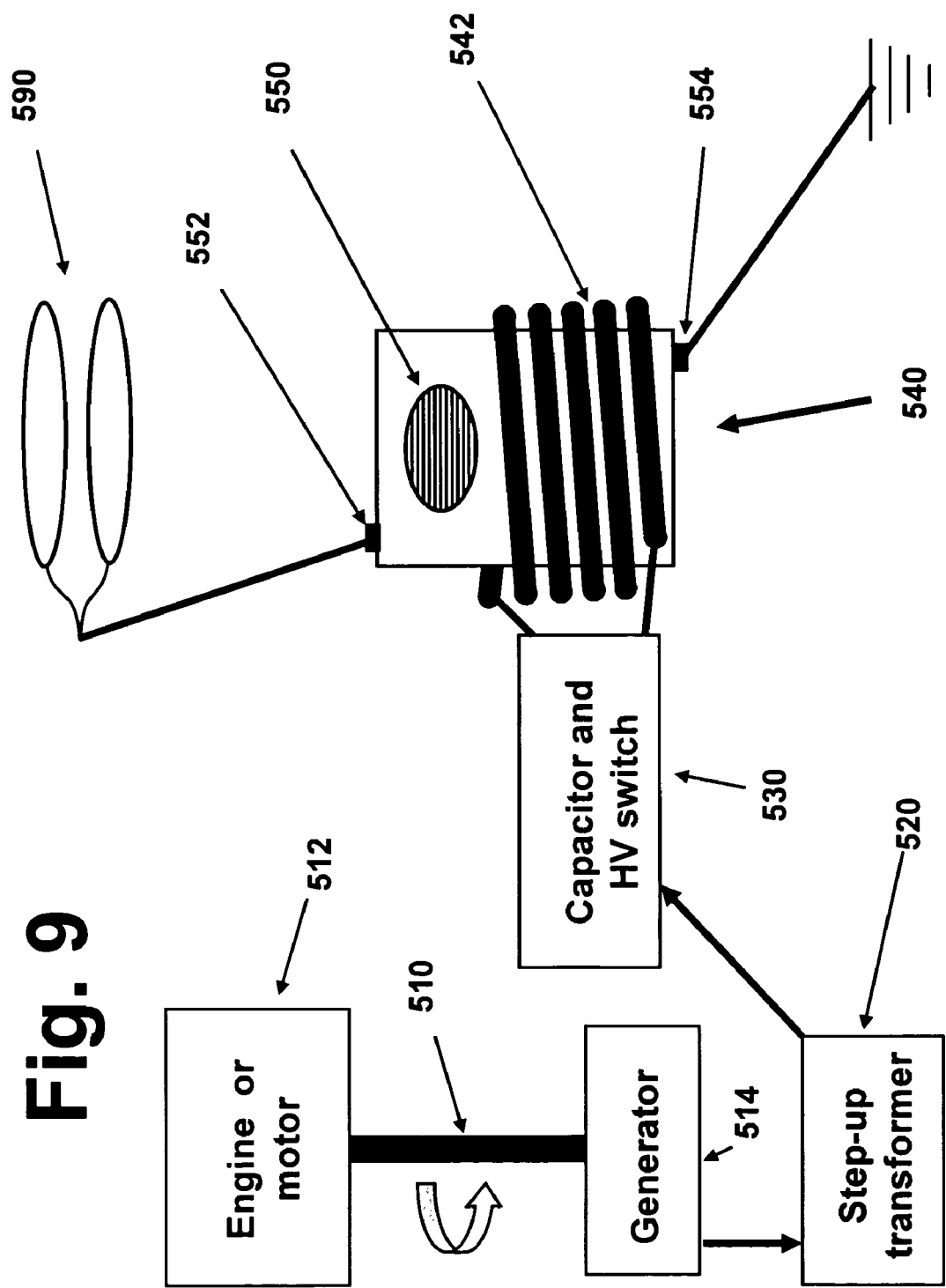
FIG. 9 depicts a reactor formed from two double-resonant spiral coils, coupled to a custom-made power supply of a type that is commonly built by Tesla coil enthusiasts.

The main components for this type of power supply system are illustrated in FIG. 9, and are shown coupled to a spiral coil reactor 590. As mentioned in the Background section, extensive additional information on these types of power supplies is available from sources such as teslasociety.com, tesladownunder.com, eskimo.com/billb/tesla/tesla.html, the Tesla Coil Mailing List at pupman.com, and a site maintained by the Finnish University & Research Network, www.nic.funet.fi/pub/sci/electrical/tesla/.

Briefly, as illustrated in FIG. 9, a "Tesla coil" power supply can begin with a conventional 220-volt, 60 hz power supply, as available in nearly all homes and offices in the US. Alternately, to "isolate" the system and eliminate the threat of damage that can be caused by power surges, kickbacks, or other adverse events, a driveshaft 510 that is coupled to a motor 512 containing a flywheel (motor 512 can be either an electric motor, or an engine powered by gasoline, diesel, or other suitable fuel) can be used to drive an electrical generator 514, which will emit AC current electric power, at a suitable voltage (such as 220 volts) and frequency (such as 60 hz).

That AC power supply is passed through a conventional "step-up" transformer 520, which will increase the voltage level, to a range that typically is from about 10,000 to about 25,000 volts (with a correspondingly lower amperage, so that the rules of conservation of energy are not violated). That voltage is sent to a capacitor and switch assembly 530, which converts it into a pulsatile voltage with a frequency that usually ranges from about 20 khz to about 1 Mhz.

That higher frequency is used to drive the large coil 542 (which typically contains from about 1 to about 25 turns of copper pipe, usually ranging from about ¼ inch to about 1 inch in diameter), which is part of a transformer 540. The inductive coupling created by transformer 540 uses the voltage passing through the large coil 542, to drive a secondary coil 550, which is made of a wire that is much thinner than the copper pipe in the large coil 542. Secondary coil 550 typically has about 800 to 1000 turns, inside transformer 540. This creates an output voltage that typically has about 1 million volts, and which runs at about 20 khz to about 1 Mhz.

In a conventional Tesla coil system (as shown in FIG. 9) which is used to create arc displays, one end 552 of secondary coil 550 is coupled to an arc emitter, which usually has a large elliptical or toroidal ("doughnut-shaped") outer surface, covered by heavy metal foil or thin sheet metal. If operated in a garage or similar location, this system will create large and visually impressive arcs of electrical energy, which will "jump" from the emitter device, to any available "grounding" or "receptor" points in the vicinity (such as the metal rails that support a garage door, if the unit is operated inside a garage).

In such a system, the opposite end 554 of the secondary coil 550 usually is "grounded". This grounding arrangement effectively provides the secondary coil 550 with a physical feature that it can use as a electrical reference point, foundation, baseline, etc. By way of analogy, this is comparable to a painter who needs a stationary and stable place to stand, and a place where he can place his easel, before he can begin painting on a canvas that sits on the easel. In a sense, the floor on which a painter stands does not actively contribute to the artwork; and yet, that floor provides an essential part of what an artist needs, to create his art.

As illustrated in FIG. 9, a conventional Tesla coil power supply can be modified, by coupling a spiral coil reactor 590 to end 552 of secondary coil 550. This arrangement provides a straightforward means for using a Tesla coil type of power supply to drive a spiral coil reactor. In general, since it is much easier to adjust and "tune" the output frequency from a commercially-available RF power supply, in a way that will match the quarter-wave resonance of a spiral coil, it likely will be preferable to use a tunable commercially-available RF power supply, during the "startup and debugging" stages while a spiral coil reactor is being developed, debugged, tweaked, and "tuned". Subsequently, after a spiral coil or spiral coil reactor has been optimized and debugged so that it becomes doubly-resonant with peak power output and EM field strength at a known and specific excitation frequency, a custom-made Tesla coil power supply system can be assembled and used. This can provide two potentially important advantages: (i) it can allow higher levels of power to be input into the system, leading to correspondingly higher levels of power output; and, (ii) it can isolate the system from the electric power grid that serves the building and local community, in ways that will reduce the risk of any truly adverse events, and the amount of damage and disruption that could otherwise be inflicted on the local power system, by adverse events.

Figure 10:
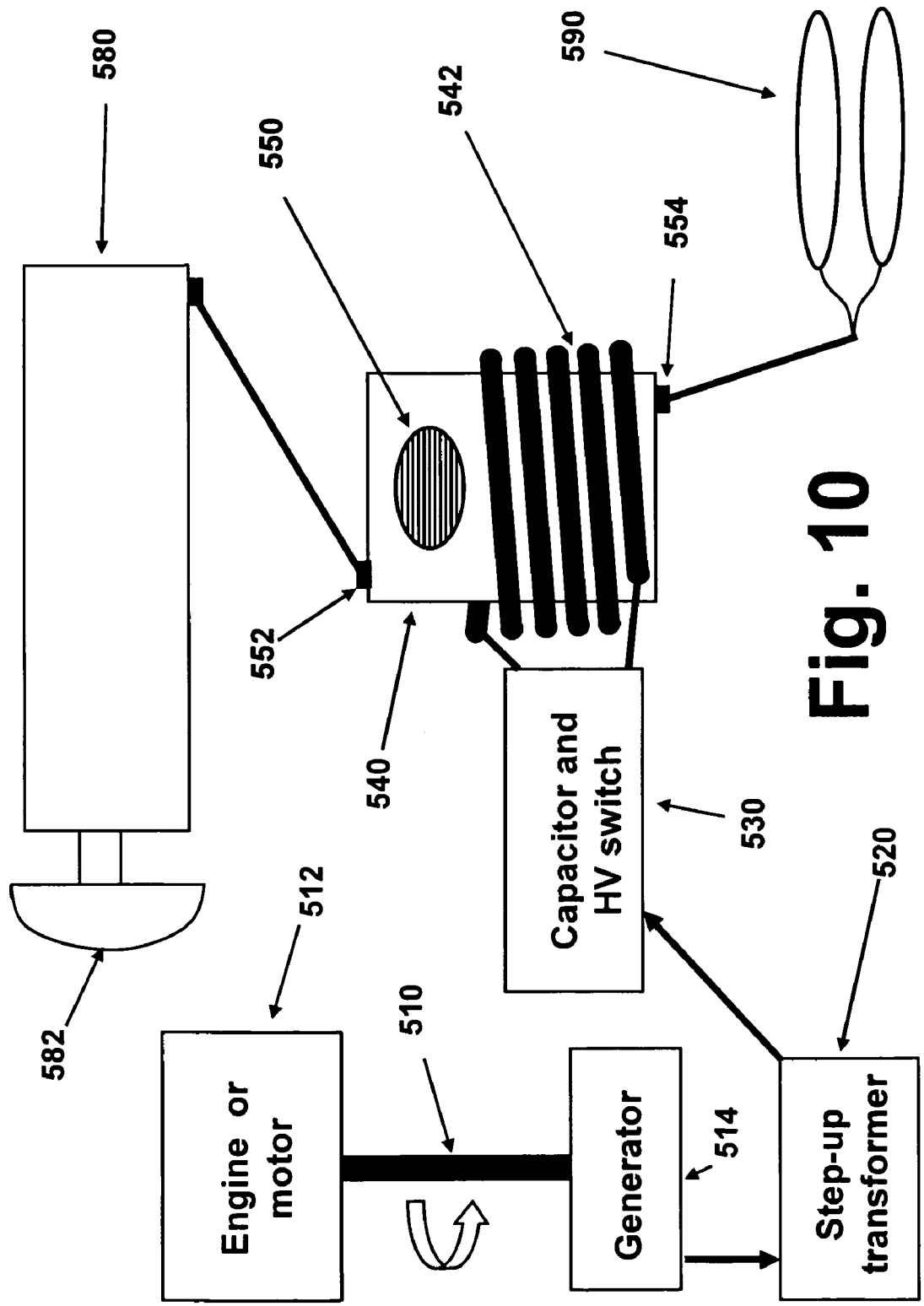
FIG. 10 depicts a reactor formed from two double-resonant spiral coils, coupled to a Tesla-type power supply that has been further modified by coupling a resonator unit to the opposing end of the inner coil of the Tesla system.

FIG. 10 illustrates another potential modification to that type of power system. In this arrangement, instead of grounding one end 554 of secondary coil 550 (as shown in FIG. 9), the corresponding end 554 of secondary coil 550 is coupled, instead, to a subassembly 580, which can be called a reflector, a resonator, or similar terms. This unit will work in a manner directly analogous to the way a simple segment of wire functions when it creates a standing wave (as illustrated in FIGS. 1-4) when excited by a relatively low-powered voltage. Since very high voltages (such as a million volts, or even higher) will emerge from a Tesla coil system, a simple wire will not be sufficient to prevent arc-type emissions, and indeed, a simple wire would almost certainly melt under those conditions. Accordingly, the reflector/resonator assembly 580 will need to be designed to withstand those voltages. This can be done by using copper pipe instead or wire, and by providing a large reflective area, in the form of a large reflective cap 582. Instead of wasting and losing part of the power output from transformer 540, by sending some quantity of power output into the ground (where it will not do any useful work, as occurs in FIG. 9), a well-designed reflector and/or resonator assembly 580 (which should be designed to operate in a resonant manner, at the same excitation frequency that creates a double-resonant response in the spiral coil(s) 590) can effectively shut down and seal up a non-useful escape route that wastes energy and power. By replacing a non-useful energy escape with a mirror-like device, this system can force the entire power output from transformer 540 to emerge through spiral coil(s) 590. This will further increase the power output, and the electromagnetic field strength and intensity, that are created by the spiral coil(s). That type of improved power supply, as illustrated in FIG. 10, is believed to be a patentable invention in its own right, and the Applicant herein explicitly declares his right and intention to pursue patent coverage of that invention, if additional research into relevant prior art shows that such an improved power supply has not previously been created.

Thus, there has been shown and described a new and useful means for creating and optimizing spiral coils and spiral coil reactors that have simultaneous standing wave resonance, and inductive-capacitive resonance, and that can generate very powerful electromagnetic fields with standing wave characteristics. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention.

REFERENCES AND WEBSITES

Corum, K. L. & Corum, J. F., "Tesla Coils and the Failure of Lumped-Element Circuit Theory," www.ttr.com/corum/index.htm Crawford, F., Waves (McGraw-Hill, College series, Berkeley Physics Course, Vol. 3, 1968)

Elmore, W. et al, Physics of Waves (Dover Publications, 1985)

Feynman, R., et al, Feynman Lectures on Physics: Definitive and Extended Edition (Addison Wesley, 2005)

Fridman, A. A. & Kennedy, L. A., Plasma Physics and Engineering (CRC, 2004)

Geller, R., Electron Cyclotron Resonance Ion Sources and ECR Plasmas (Taylor & Francis, 1996)

Hayt, W. et al, Engineering Electromagnetics (McGraw Hill Higher Education, 7th edition, 2005)

Kuphaldt, T., et al, "Resonance", Chapter 3, Fundamentals of Electrical Engineering and Electronics, 2005 (www.vias.org/feee/resonant_03.html)

Lichtenberg, A., et al, "Non-adiabatic and stochastic mechanisms for cyclotron resonance trapping and heating in mirror geometries," Plasma Phys. 11: 101-116 (1969)

Nave, C., "Series Resonance," HyperPhysics (Georgia State University, 2006) hyperphysics.phy-astr.gsu.edu/hbase/electric/serres.html Wysock, W., "Design & Construction of ½-Wave Tesla Coil," pp. 51-54, International Tesla Society, 1992 www.ttr.com/Model12_ITS_article.htm www.resonanceswavesandfields.blogspot.com www.coilqcorp.com/metertesting.asp  www.pupman.com/listarchives/1995/april/msg00073.html www.variac.com/www.instserv.com/variable.htm www.elect-spec.com/variac.htm www.electricpowergenerator.com/generatorheadsets.html

The invention claimed is:

1. A device for creating an electromagnetic field, comprising a at least two spiral coils, wherein each spiral coil is made from a segment of conductive material having a fixed length and cross-sectional shape, wherein:
   a. the segment of conductive material is designed and suited to establish a standing electromagnetic field around said spiral coil when one end of the segment of conductive material is excited by an alternating voltage at an operating frequency which corresponds to the fixed length of the segment of conductive material; and,
   b. said spiral coil has a wound shape and size which will create inductive-capacitive resonance within said spiral coil, when said spiral coil is excited by the operating frequency which establishes a standing electromagnetic field around said spiral coil;
   and wherein said spiral coils are positioned proximate to each other in a manner which creates an electromagnetic field between said spiral coils when each of said spiral coils is excited by an operating frequency.

2. The device of claim 1, which has a power factor that is at least 80 percent of an optimal power factor that would be achieved if said alternating voltage were perfectly synchronized with an alternating current response within the segment of conductive material.

3. The device of claim 1, which has a power factor that is at least 90 percent of an optimal power factor that would be achieved if said alternating voltage were perfectly synchronized with an alternating current response within the segment of conductive material.

4. The device of claim 1, which operates as a field-generating electromechanical component within a larger assembly that contains at least two such spiral coils.

5. A reactor device for treating charged particles, comprising at least two spiral coils, wherein each spiral coil is made from a segment of conductive material having a fixed length and cross-sectional shape, wherein:

a. the segment of conductive material is designed and suited to establish a standing electromagnetic field around said spiral coil when one end of the segment of conductive material is excited by an alternating voltage at an operating frequency which corresponds to the fixed length of the segment of conductive material; and, b. said spiral coil has a wound shape and size which create inductive-capacitive resonance within said spiral coil, when said coil is excited by said operating frequency which establishes a standing electromagnetic field around said spiral coil;

and wherein said spiral coils are positioned proximate to each other in a manner which creates an electromagnetic field between said spiral coils when each of said spiral coils is excited by an operating frequency.

6. The reactor system of claim 1, wherein each spiral coil has a power factor that is at least 80 percent of an optimal power factor that would be achieved if said alternating voltage were perfectly synchronized with an alternating current response within the segment of conductive material.

7. The reactor system of claim 1, wherein each spiral coil has a power factor that is at least 90 percent of an optimal power factor that would be achieved if said alternating voltage were perfectly synchronized with an alternating current response within the segment of conductive material.

* * * * *